(12) United States Patent
Turi et al.

(10) Patent No.: US 12,413,495 B2
(45) Date of Patent: Sep. 9, 2025

(54) TECHNIQUES FOR PROVIDING INTER-CLUSTER DEPENDENCIES

(71) Applicant: Cisco Technology, Inc., San Jose, CA (US)

(72) Inventors: Peter Turi, Budapest (HU); Zsolt Varga, Budapest (HU); Thomas Szigeti, Vancouver (CA)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 18/213,602

(22) Filed: Jun. 23, 2023

(65) Prior Publication Data
US 2023/0336453 A1    Oct. 19, 2023

Related U.S. Application Data

(63) Continuation of application No. 17/530,034, filed on Nov. 18, 2021, now Pat. No. 11,729,082.

(51) Int. Cl.
*G06F 15/173* (2006.01)
*H04L 43/0823* (2022.01)
(Continued)

(52) U.S. Cl.
CPC ...... *H04L 43/0864* (2013.01); *H04L 43/0841* (2013.01); *H04L 43/0847* (2013.01); *H04L 67/561* (2022.05); *H04L 69/22* (2013.01)

(58) Field of Classification Search
CPC ............. H04L 43/0841; H04L 43/0847; H04L 43/0864; H04L 67/561; H04L 69/22
(Continued)

(56) References Cited

U.S. PATENT DOCUMENTS 6,018,737 A * 1/2000 Shah ...................... H04Q 3/005
707/999.01
9,286,179 B1 * 3/2016 Shalla ..................... G06F 11/26
(Continued)

OTHER PUBLICATIONS

Office Action for U.S. Appl. No. 17/529,975, mailed on Apr. 20, 2023, Inventor # 1Peter Turi, "Techniques for Determining Service Risks and Causes ," 25 pages.
(Continued)

*Primary Examiner* — Bharat Barot
(74) *Attorney, Agent, or Firm* — Lee & Hayes, P.C.

(57) ABSTRACT

This disclosure describes techniques for providing information associated with an inter-cluster segment. For instance, system(s) may determine dependencies for first services associated with a first cluster and second dependencies for second services associated with a second cluster. The system (s) may then determine information for interconnections between the first cluster and the second cluster. The information may include at least dependencies for third services included in the inter-cluster segment and/or performance information for the third services. The system(s) may then generate a user interface that includes the first dependencies for the first services, the second dependencies for the second services, and the information for the inter-cluster segment. This way, a user is able to use the user interface to identify both problems occurring within the clusters and/or problems that are caused by the third services in the inter-cluster segment.

20 Claims, 17 Drawing Sheets

(51) Int. Cl.
*H04L 43/0829* (2022.01)
*H04L 43/0864* (2022.01)
*H04L 67/561* (2022.01)
*H04L 69/22* (2022.01)

(58) Field of Classification Search
USPC .................................. 709/223–224, 227–228
See application file for complete search history.

(56) References Cited

U.S. PATENT DOCUMENTS

| | | | |
|---|---|---|---|
| 10,547,633 | B1 | 1/2020 | Matteo et al. |
| 10,652,281 | B1* | 5/2020 | Moolenaar ............ H04L 63/0236 |
| 11,082,411 | B2* | 8/2021 | Li ........................ H04L 67/1097 |
| 11,233,744 | B2* | 1/2022 | Sesha .................. H04L 43/0876 |
| 11,296,955 | B1 | 4/2022 | Fletcher et al. |
| 11,399,072 | B2 | 7/2022 | Kaladagi |
| 11,621,896 | B2* | 4/2023 | Clemm .................... H04L 69/22 709/224 |
| 11,695,648 | B2* | 7/2023 | Schneider ............ H04L 43/0847 370/235 |
| 2005/0181835 | A1 | 8/2005 | Lau et al. |
| 2008/0049621 | A1* | 2/2008 | McGuire ................. H04L 41/00 370/236.2 |
| 2013/0246105 | A1 | 9/2013 | Winkler et al. |
| 2014/0237550 | A1 | 8/2014 | Anderson et al. |
| 2016/0119437 | A1 | 4/2016 | Sylla |
| 2018/0026856 | A1 | 1/2018 | Yang et al. |
| 2018/0198917 | A1 | 7/2018 | Ristock et al. |
| 2018/0300041 | A1 | 10/2018 | Alexei et al. |
| 2019/0014454 | A1* | 1/2019 | Garcia Martin ...... H04L 67/566 |
| 2019/0215239 | A1 | 7/2019 | Li |
| 2020/0019935 | A1 | 1/2020 | Jan et al. |
| 2020/0042328 | A1 | 2/2020 | Gupta |
| 2020/0097981 | A1 | 3/2020 | Teo et al. |
| 2020/0259715 | A1 | 8/2020 | Schermann et al. |
| 2020/0296017 | A1 | 9/2020 | Mazzitelli et al. |
| 2020/0296172 | A1 | 9/2020 | Gunjal et al. |
| 2020/0366752 | A1 | 11/2020 | White |
| 2020/0409781 | A1 | 12/2020 | Zhen et al. |
| 2021/0027136 | A1 | 1/2021 | Hwang et al. |
| 2021/0184951 | A1 | 6/2021 | Bonas |
| 2021/0204091 | A1 | 7/2021 | Schubert et al. |
| 2021/0232485 | A1 | 7/2021 | Agarwal et al. |
| 2021/0243247 | A1 | 8/2021 | He et al. |
| 2021/0303985 | A1 | 9/2021 | Lakshmikantha et al. |
| 2022/0092668 | A1 | 3/2022 | Lu et al. |
| 2022/0350642 | A1 | 11/2022 | Poddar et al. |
| 2022/0357861 | A1 | 11/2022 | Lee |
| 2023/0153725 | A1 | 5/2023 | Turi |
| 2023/0153736 | A1 | 5/2023 | Turi |
| 2023/0155911 | A1 | 5/2023 | Turi |
| 2023/0239243 | A1* | 7/2023 | Ros Giralt .......... H04L 47/2425 370/235 |

OTHER PUBLICATIONS

Office Action for U.S. Appl. No. 17/530,034, mailed on Nov. 25, 2022, Turi, "Techniques for Providing Inter-Cluster Dependencies", 9 pages.

Office Action for U.S. Appl. No. 17/529,975, mailed on Jun. 26, 2024, Turi et al., "Techniques For Determining Service Risks and Causes", 35 pages.

Office Action for U.S. Appl. No. 17/529,975, mailed on Feb. 22, 2024, Inventor #1 Peter Turi, "Techniques for Determining Service Risks and Causes", 34 pages.

Office Action for U.S. Appl. No. 17/529,920, mailed on May 22, 2024, Turi, P, "Providing Business Values With Service Health Scores ," 45 pages.

Office Action for U.S. Appl. No. 17/529,920, mailed on Jun. 23, 2023, Inventor #1 Peter Turi, "Providing Business Values With Service Health Scores ," 36 pages.

Office Action for U.S. Appl. No. 17/529,975, mailed on Sep. 29, 2023, Turi, "Techniques for Determining Service Risks and Causes", 31 pages.

* cited by examiner

FIG. 2

TECHNIQUES FOR PROVIDING INTER-CLUSTER DEPENDENCIES

TECHNICAL FIELD

This application is a continuation of U.S. application Ser. No. 17/530,034, filed Nov. 18, 2021, titled "TECHNIQUES FOR PROVIDING INTER-CLUSTER DEPENDENCIES," which is fully incorporated herein by reference. The present disclosure relates generally to techniques for providing information associated with services.

BACKGROUND

A system may use management tools in order to determine health scores for services. For example, the management tools may analyze key performance indicators associated with the services and, based on the analysis, determine the health scores for the services. The system is then able to provide the health scores for the services to one or more users that use the health scores for various reasons. For example, if more than one service is experiencing a problem, the user(s) are able to use the health scores to determine which services are experiencing the problems and then prioritize these services for revisions, upgrades, and/or the like. While the health scores provide important information for the user(s) to determine the priorities for the services, in some instances, other types of information may be important to the user(s) when prioritizing these services.

BRIEF DESCRIPTION OF THE DRAWINGS

The detailed description is set forth below with reference to the accompanying figures. In the figures, the left-most digit(s) of a reference number identifies the figure in which the reference number first appears. The use of the same reference numbers in different figures indicates similar or identical items. In some cases, parentheticals are utilized after a reference number to distinguish like elements. Use of the reference number without the associated parenthetical is generic to the element. The systems depicted in the accompanying figures are not to scale and components within the figures may be depicted not to scale with each other.

FIG. 2 illustrates an example of a user interface that includes health scores and business values associated with services, in accordance with the present concepts.

DESCRIPTION OF EXAMPLE EMBODIMENTS

Overview

Figure 1:
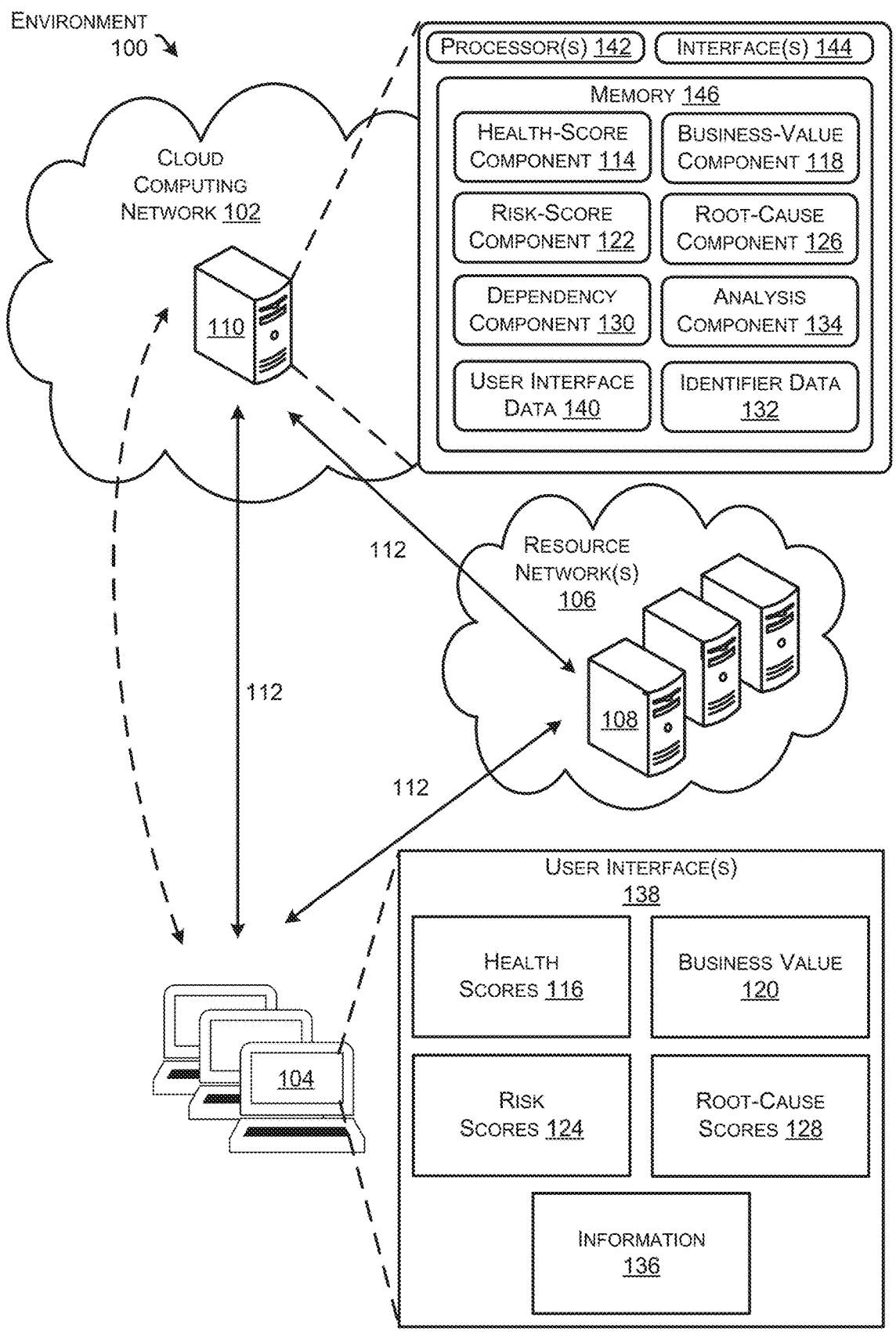
FIG. 1 illustrates a component diagram with an example environment in which techniques for providing information associated with services may be provided, in accordance with the present concepts.

This disclosure describes, at least in part, a method for providing flow visibility for data flow between services in a secure network environment. The method includes routing an encrypted data flow over a network that connects a first service with a second service. Routing information of the encrypted data flow is obtained from at least one of a first device associated with a first service or a second device associated with a second service. Dependencies between the first service and the second service are determined based at least in part upon the routing information.

Example Embodiments

This disclosure describes, at least in part, techniques for providing information associated with services. For instance, system(s) may determine health scores and one or more topologies associated with services. The system(s) may then use the health scores and the one or more topologies to provide information to one or more users. For a first example, the system(s) may further determine business values associated with the services and then generate a user interface that includes at least the health scores along with the business values for the services. For a second example, the system(s) may use the health scores to determine risk scores and/or root-cause scores associated with the services. The system(s) may then generate a user interface that includes the health scores, the risk scores, and/or the root-cause scores associated with the services. Still, for a third example, the system(s) may use the topologies to determine dependencies of services associated with different clusters, where the clusters are interconnected via a network. The system(s) may then determine information for the inter-cluster segment associated with the network and generate a user interface that includes the dependencies and the information. In either of the examples, the system(s) may then provide the user interfaces to a user device so that a user of the user device is able to prioritize services, such as services that are experiencing and/or may experience problems, for revisions, upgrades, and/or the like.

For more details, the system(s) may initially determine the health scores associated with the services. In some examples, the system(s) determine the health scores using one or more microservice management tools, such as Cisco Service Mesh Manager (SSM). For example, to determine a health score for a given service, the system(s) may determine key performance indicators (KPIs) relating to the service. As described herein, the KPIs for the service may include, but are not limited to, an error rate, a latency, a request rate, a success rate, a request volume, a request duration, a request size, a Hypertext Transfer Protocol (HTTP) error code, a packet drop rate, and/or any other type of indicator that the system(s) may use to determine the health score. The system(s) may then use the KPIs related to the service to determine the health score, using one or more processes. Additionally, the system(s) may use similar techniques in order to determine the health scores for the other services. While this is just one example technique of how the system(s) may determine the health scores for the services, in other examples, the system(s) may use additional and/or alternative techniques to determine the health scores.

While the health scores for the services may be important to user(s), in some circumstances, additional information, such as business values for the services may also be important when making decisions associated with the services. As such, the system(s) may additionally be configured to determine the business values for the services. In some examples, the system(s) determine the business values using one or more Application Performance Monitoring (APM) agents, such as AppDynamics Multi-Tenant Agent (MTA). As described herein, a business value associated with a service may include, but is not limited to, a revenue, a cost, a worth of a transaction, and/or any other type of business value. For a first example, a business value for a service may indicate a revenue that the service generates for an entity, such as a business, a company, a corporation, and/or the like (e.g., the revenue is $10,000 per day). For a second example, a business value for a service may indicate the cost that the entity experiences when there is an outage for the service (e.g., the cost for the service is $10,000 per hour). Still, for a third example, a business value for a service may indicate a worth associated with a transaction that is performed by the service (e.g., the transaction is worth $10,000 for the entity). While these are just a couple examples of business values for services, in other examples, the system(s) may determine additional and/or alternative types of business values.

The system(s) may then provide at least the business values along with the health scores for the services. For example, the system(s) may generate a user interface that includes at least identifiers (e.g., names, codes, numbers, etc.) of the services, the health scores for the services, and the business values for the services. In some examples, the user interface includes the information in different rows. For example, each row of the user interface may include at least a respective identifier of a service, a respective health score for the service, and a respective business value for the service. However, in other examples, the user interface may provide the information using additional and/or alternative techniques. The system(s) may then send the user interface to a user device so that the user device is able to provide the user interface to a user. By providing this information in a single user interface to the user, the user is able to analyze both the health scores and the business values of the services when prioritizing the services.

In some examples, in addition to, or alternatively from, the user determining the priorities, the system(s) may also determine the priorities for the services using the health scores and the business values. For a first example, the system(s) may determine the priorities based on the health scores, where the system(s) determine that a first service with a lowest health score is prioritized first, followed by a second service with the second lowest health score, followed by a third service with the third lowest health score, and/or so forth. For a second example, the system(s) may determine the priorities based on the business values, where the system(s) determine that a first service with a highest business value is prioritized first, followed by a second service with the second highest business value, followed by a third service with the third highest business value, and/or so forth. Still, for a third example, the system(s) may determine the priorities for the services using a combination of the health scores and the business values. For instance, the system(s) may use the health scores and the business values to prioritize the services in such a way that minimizes a loss that may occur from problems with the services.

In some examples, the system(s) may use the health scores, along with dependencies between the services, to determine additional information that may also be provided to the user(s). For instance, the system(s) may use the health scores and the dependencies to determine risk score(s) for one or more of the services. As described herein, a risk score may indicate a probability and/or likelihood that a service will experience problems because of the health of service(s) that are upstream and/or downstream from the service. For example, a first service may include a high health score (e.g., a healthy health score), a second service that depends from the first service may include a low health score (e.g., an unhealthy health score), a third service that depends from the second service may include a high health score, and a fourth service that depends from the third service may also include a low health score. As such, even though the first service includes a high health score, the risk score associated with the first service may indicate that there is a high probability that the first service will experience problems because of the health scores (e.g., the two low health scores) of the other services for which the first service includes dependencies.

The system(s) may perform one or more techniques to determine the risk score using the health scores and/or so the dependencies. For a first example, the system(s) may determine the risk score using an average of the health scores for the service and the dependent services. For a second example, the system(s) may determine the risk score using the lowest health score from among the health scores for the service and the dependent services. Still, for a third example, the system(s) may determine the risk score using the highest health score from among the health scores for the service and the dependent services. Additionally, in some examples, the system(s) may use one or more weights when determining the risk score. For example, the system(s) may use a first weight for the first health score of the first service, a second weight for the second health score of the second service, a third weight for the third health score of the third service, and/or so forth.

In some examples, when using the health scores of the dependent services to determine the risk score, the system(s) may use the health scores for a threshold number of the dependent service(s). For example, if the service includes ten upstream dependent services and ten downstream dependent services, then the system(s) may use the health scores for a threshold number of the upstream services (e.g., three) and/or the health scores for a threshold number of the downstream services (e.g., three). Additionally, while these are just a couple example techniques of how the system(s) may determine the risk score, in other examples, the system(s) may determine the risk score using additional and/or alternative techniques.

In addition to, or alternatively from, determining the risk scores, the system(s) may use the health scores and the dependencies to determine root-cause scores(s) for one or more of the services. As described herein, a root-cause score may indicate a probability and/or likelihood that the service is the cause for problem(s) that are occurring, such as with other dependent services (e.g., downstream dependent services). For example, a first service may include a high health score (e.g., a healthy health score), a second service that depends from the first service may include a medium health score (e.g., a partly unhealthy health score), a third service that depends from the second service may include medium health score, and a fourth service that depends from the third service may include a low health score (e.g., an unhealthy health score). As such, even though the second service includes the medium health score, the root-cause score for the second service may indicate that there is a high probability that the second service is the cause of the downstream problems for at least the third service and the fourth service.

The system(s) may perform one or more techniques to determine the root-cause score using the health scores and the dependencies. For a first example, the system(s) may determine the root-cause score using an average of the health scores for the service and the dependent services. For a second example, the system(s) may determine the root-cause score using the lowest health score among the health scores for the service and the dependent services. Still, for a third example, the system(s) may determine the root-cause score using the highest health score among the health scores for the service and the dependent services. Additionally, in some examples, the system(s) may use one or more weights when determining the root-cause score. For example, the system(s) may use a first weight for the first health score of the first service, a second weight for the second health score of the second service, a third weight for the third health score of the third service, and/or so forth.

In some examples, when using the health scores of the dependent services to determine the root-cause score, the system(s) may use the health scores for a threshold number of the dependent service(s). For example, if the service includes ten upstream dependent services and ten downstream dependent services, then the system(s) may use the health scores for a threshold number of the upstream services (e.g., three) and/or the health scores for a threshold number of the downstream services (e.g., three). Additionally, while these are just a couple example techniques of how the system(s) may determine the root-cause score, in other examples, the system(s) may determine the root-cause score using additional and/or alternative techniques.

In some examples, the risk score and/or the root-cause score may be inverse to the health score for a service. For example, a high health score may indicate that the service is in a healthy state and not currently experiencing any problems. However, a high risk score may indicate that the service has a high probability for experiencing a problem. Additionally, a high root-cause score may indicate that there is a high probability that the service is the cause of problems for downstream services. In other words, the service may be in a healthy state when the service includes the high health score, a low risk score, and/or a low root-cause score. This is because such scores may indicate that the service is not currently experiencing any problems, the service is not at risk to experience any problems, and the service is not the cause of problems that may be occurring to downstream services. However, in other examples, the system(s) may use additional and/or alternative scoring techniques when determining the scores for the service.

In some examples, the system(s) may then provide at least the health scores, the risk scores, and/or the root-cause scores. For example, the system(s) may generate a user interface that includes at least the identifiers (e.g., names, codes, numbers, etc.) of the services, the health scores for the services, the risk scores for the services, and/or the root-cause scores for the services. In some examples, the user interface may include the same user interface described above that also includes the business values. However, in other examples, the user interface may be different than the user interface that includes the business values. In either example, by providing this information in a single user interface, the user(s) are then able to analyze both the health scores, the risk scores, and/or the root-cause scores (and/or, in some examples, the business values scores in) of the services when prioritizing the services.

In some examples, in addition to, or alternatively from, the user determining the priorities, the system(s) may also determine the priorities for the services using the health scores, the risk scores, and/or the root-cause scores. For a first example, the system(s) may determine the priorities based on the health scores, where the system(s) determine that a first service with a lowest health score is prioritized first, followed by a second service with the second lowest health score, followed by a third service with the third lowest health score, and/or so forth. For a second example, the system(s) may determine the priorities based on the risk scores, where the system(s) determine that a first service with a highest risk score is prioritized first, followed by a second service with the second highest risk score, followed by a third service with the third highest risk score, and/or so forth. For a third example, the system(s) may determine the priorities based on the root-cause scores, where the system(s) determine that a first service with a highest root-cause score is prioritized first, followed by a second service with the second highest root-cause score, followed by a third service with the third highest root-cause score, and/or so forth. Still, for a fourth example, the system(s) may determine the priorities for the services using a combination of the health scores, the risk scores, and/or the root-cause scores.

In some examples, the system(s) may further be configured to provide additional information with service meshes. For example, the system(s) may determine first dependencies for first services associated with a first cluster (e.g., a first service mesh environment) and second dependencies for second services associated with a second cluster (e.g., a second service mesh environment). First service(s) associates with the first cluster may be interconnected with second service(s) associated with the second cluster. For instance, the first service(s) may communicate with the second service(s) over a network. As such, the system(s) may further determine information associated with the inter-cluster segment that is between the first cluster and the second cluster. In this example, the inter-cluster segment may be associated with third services and/or devices that are included in the network path(s) between the first cluster and the second cluster. For example, the information may include third dependencies associated with the third services and/or the devices that are included in the inter-cluster segment. In some examples, the information may further include performance information associated with the third services and/or the devices. The performance information may include one or more KPIs associated with the third services and/or the devices, such as latencies, packet drop rates, error rates, and/or any other performance information.

The system(s) may then generate a user interface that provides the first dependencies for the first services associated with the first cluster, the second dependencies for the second services associated with the second cluster, and the information associated with the inter-cluster segment. In some examples, the user interface may initially include the first dependencies, the second dependencies, and an interface element for viewing the information associated with the inter-cluster segment. As described herein, an interface element may include, but is not limited to, a button, an image, a graphic, text, and/or any other content that is selectable by a user. In these examples, once the interface element is selected, the user interface may perform one or more processes. For a first example, the user interface may provide the information associated with the inter-cluster segment along with the first dependencies associated with the first cluster and the second dependencies associated with the second cluster. For a second example, the user interface may cease providing the first dependencies associated with the first cluster and the second dependencies associated with the second cluster, but then provide the information associated with the inter-cluster segment. In either of these examples, the user is then able to use the user interface to determine the dependencies associated with the clusters as well as the inter-cluster segment information.

The example above describe that the system(s) determine the information associated with the inter-cluster segment. In some examples, to determine the information, the system(s) (e.g., a service mesh management tool) may generate and/or assign identifier(s) to service(s). For example, the system(s) may generate and/or assign identifier(s) for one or more of the first services, identifier(s) for one or more of the second services, and/or identifier(s) for one or more services included in the inter-cluster segment. The system(s) may then inject an identifier into a network header (an Internet Protocol (IP) header, an IPv6 header, a Transmission Control Protocol header, a NSH, etc.). In some examples, the system(s) may further inject signaling that indicates the start and end of the microservice and/or metadata associated with the service. In some examples, the system(s) inject the signaling into the third layer while injecting the identifier and the metadata into the fourth layer.

The system(s) may then export, store, and/or analyze the identifier and/or the metadata in order to determine the information about the inter-cluster segment. In some examples, the identifier and/or the metadata are exported, collected, and/or analyzes using one or more components of the system(s). For example, the identifier and/or the metadata may be exported using an exporter component (e.g., NetFlow Exporter) of the system(s). The identifier and/or the metadata may be collected using a collector component (e.g., NetFlow Collector) of the system(s). Finally, the identifier and/or the metadata may be analyzed using an analyzer component (e.g., NetFlow Analyzer) in order to determine the information about the inter-cluster segment.

By performing the processes described herein, users, such as application developers, site reliability engineers, application administrators, and/or the like, may be provided with additional information beyond just health scores for the services. This way, the users are able to make more informed decisions when prioritizing services for revisions, upgrades, and/or the like. Additionally, and as described herein, in some examples, the system(s) may also be configured to analyze the health scores, the business values, the risk scores, the root-cause scores, and/or the information associated with the inter-cluster segment in order to prioritize the services for the users. In such examples, the system(s) may analyze all of the values, the scores, and the information using one or more machine learning models and/or algorithms.

Certain implementations and embodiments of the disclosure will now be described more fully below with reference to the accompanying figures, in which various aspects are shown. However, the various aspects may be implemented in many different forms and should not be construed as limited to the implementations set forth herein. The disclosure encompasses variations of the embodiments, as described herein. Like numbers refer to like elements throughout.

FIG. 1 illustrates a component diagram with an example environment in which techniques for providing scores and dependency information may be provided, in accordance with the present concepts. The example environment 100 may include a cloud computing network 102 (e.g., network), user device(s) 104, and resource network(s) 106 that host resource(s) 108. Parentheticals are utilized after a reference number to distinguish like elements. Use of the reference number without the associated parenthetical is generic to the element. Additionally, although the example of FIG. 1 illustrates the user device(s) 104 as including desktop computers and the resource(s) 108 as including servers, in other examples, the user device(s) 104 and/or the resource(s) 108 may include any other type of device.

In some examples, the environment 100 comprises a data center or cloud-computing network comprising servers and other network components (e.g., routers, switches, etc.) stored across multiple data centers located across geographic areas. In these instances, the cloud-computing environment may be a distributed network through which devices interact with service provided by the cloud computing network. The cloud computing network may provide on-demand availability of computing system resources, such as data storage, computing power (e.g., CPU, GPU, etc.), networking, databases, etc., without direct active management by users. In some examples, the cloud computing network may be managed and maintained by a service provider such that users do not have to invest in and maintain the computing infrastructure for their computing resource needs.

The user device(s) 104 and the resource(s) 108 may be communicatively coupled among one another and/or to various other devices via the cloud computing network 102 and/or the resource network(s) 106. Within the example environment 100, the user device(s) 104, the resource(s) 108, and/or other devices may exchange communications (e.g., packets) via network connection(s) to system(s) 110 of the cloud computing network 102, indicated by double arrows 112. For instance, network connections 112 may be transport control protocol (TCP) network connections or any network connection (e.g., information-centric networking (ICN)) that enables the devices to exchange packets with other devices via the cloud computing network 102 and/or the resource network(s) 106. The network connections 112 represent, for example, a data path between each of the user device(s) 104, the resource(s) 108, and/or the system(s) 110.

For example, the user device(s) 104 may be computers, laptops, mobile devices, tablets, etc., while the system(s) 110 may be configured to provide data and/or network services, such as network and services monitoring, to the user device(s) 104. The system(s) 110 may or may not be a producer, a point of generation, and/or origination of the data. For instance, the data may originate elsewhere for the system(s) 110 to be able to provide the data to the user device(s) 104. Additionally, or alternatively, the data may pass through other network devices (e.g., router, switch) on a path between the system(s) 110 and the user device(s) 104. It should be appreciated that the term "network connection" may also be referred to as a "network path." The use of a cloud computing network in this example is not meant to be limiting. Other types of networks are contemplated in accordance with the emergency notification concepts described herein.

The resource(s) 108 may include applications, microservices, services, data storage, data processing, and/or any other type of resource that may be provided via networks. In some examples, the resource(s) 108 are included as part of the cloud computing network 102. In other examples, the resource(s) 108 are separate from the cloud computing network 102.

The system(s) 110 may be configured to perform various techniques in order to provide scores and dependency information associated with services. For example, a health-score component 114 of the system(s) 110 may be configured to determine health scores 116 associated with the services. In some examples, the health-score component 114 includes one or more microservice management tools, such as SSM, which are configured to determine the health scores 116 for the services. For example, to determine a health score 116 for a given service, the health-score component 114 may determine KPIs relating to the service. As described herein, the KPIs for the service may include, but are not limited to, an error rate, a latency, a request rate, a success rate, a request volume, a request duration, a request size, a HTTP error code, a packet loss rate, and/or any other type of indicator that the health-score component 114 may use to determine the health score 116. The health-score component 114 may then use the KPIs related to the service to determine the health score 116, using one or more processes. Additionally, the health-score component 114 may use similar techniques in order to determine the health scores 116 for the other services.

In some examples, the health scores 116 for the services may be represented using a range. For example, the health scores 116 may fall within a range between 0 and 100, where 100 indicates a healthy service, 0 indicates an unhealthy service, and a score between 0 and 100 represents a service that is between healthy and unhealthy. However, while this example describes a range of 0 to 100, in other examples, the health scores 116 may fall within other types of ranges (e.g., 0 to 1,000).

Additionally, or alternatively, in some examples, the health scores 116 for the services may be represented using a different type of indicator. For example, the health scores 116 may be represented using colors, where green indicates a healthy service, red represents an unhealthy service, and a spectrum of colors between green and red represents health scores 116 for services that fall between healthy and unhealthy. Again, while this example describes using green and red as the extreme colors for the health scores 116, in other examples, the health scores 116 may be represented using additional and/or alternative colors. Additionally, in some examples, the health scores 116 may be represented using more that one technique, such as numerical values and colors.

A business-value component 118 of the system(s) 110 may be configured to determine the business values 120 associated with the services. In some examples, the business-value component 118 includes one or more APM agents, such as AppDynamics MTA, which are configured to determine the business values 120 associated with the services. As described herein, a business value 120 associated with a service may include, but is not limited to, a revenue, a cost, a worth of a transaction, and/or any other type of business value 120. For a first example, a business value 120 for a service may indicate a revenue that the service generates for an entity (e.g., a business, a company, a corporation, etc.). For instance, the business value 120 for the service may indicate that the service generates $1,000,000 a day for the entity. For a second example, a business value 120 for a service may indicate the cost that the entity experiences when there is an outage for the service. For instance, the business value 120 for the service may indicate that an outage that lasted an hour cost the entity $50,000. Still, for a third example, a business value 120 for a service may indicate a worth associated with a transaction that is performed by the service. For instance, the business value 120 for the service may indicate that the transaction for the service is worth $75,000 to the entity. While these are just a couple examples of business values 10 for services, in other examples, the business value component 118 may determine additional and/or alternative types of business values 120.

A risk-score component 122 of the system(s) 110 may be configured to determine the risk scores 124 associated with one or more of the services using at least the health scores 116 and the dependencies between services. As described herein, a risk score 124 may indicate probability and/or likelihood that a given service will experience problems because of the health of service(s) that are upstream and/or downstream from the given service. For example, a first service may include a high health score 116 (e.g., 99), a second service that depends from the first service may include a low health score 116 (e.g., 10), a third service that depends from the second service may include a high health score 116 (e.g., 95), and a fourth service that depends from the third service may also include a low health score 116 (e.g., 15). As such, even though the first service includes a high health score 116, the risk score 124 associated with the first service may indicate that there is a high probability that the first service will experience problems because of the health scores 116 of the other services for which the first service includes dependencies. In other words, the risk score 124 may indicate potential problems that may occur with the first service even when the first service is currently healthy.

Figure 3A:
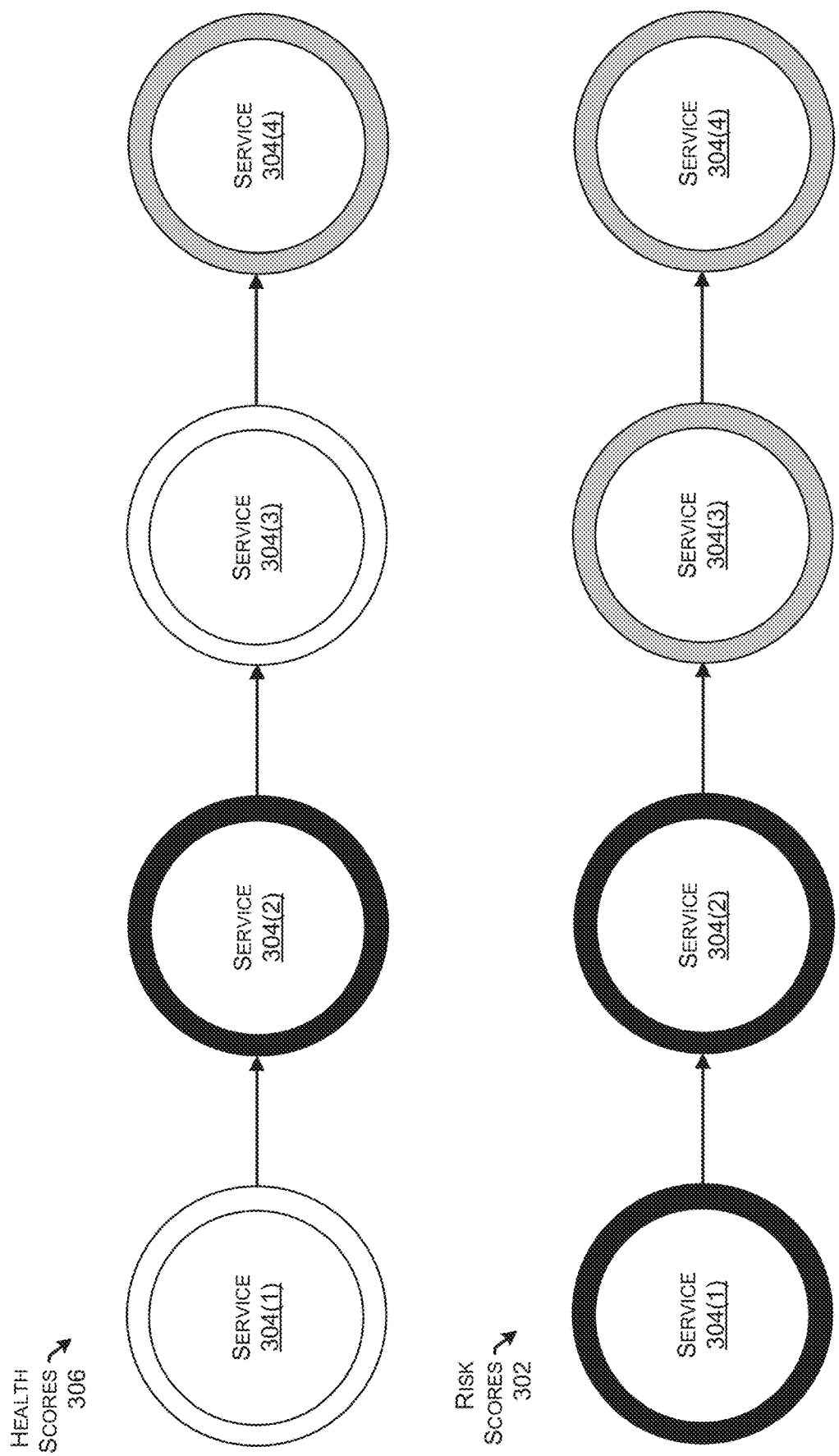
FIG. 3A illustrates an example of determining risk scores associated with services, in accordance with the present concepts.

The risk-score component 122 may perform one or more techniques to determine the risk score 124 using the health scores 116 and the dependencies (which is illustrated in the example of FIG. 3A). For a first example, the risk-score component 122 may determine the risk score 124 using an average of the health scores 116 for the service and the dependent services. For instance, and using the example above, the risk-score component 122 may determine the risk score 124 for the first service using an average health score of 54.75. For a second example, the risk-score component 122 may determine the risk score 124 using the lowest health score 116, the highest risk score 124, and/or the like among the health scores 116 for the service and the dependent services. For instance, and again using the example above, the risk-score component 122 may determine the risk score 124 for the first service using the lowest health score 116, such as 10. Still, for a third example, the risk-score component 122 may determine the risk score 124 by weighing the health scores 116 for the service and the dependent services. For instance, the risk-cause component 122 may provide more weight to the health score 116 of the service than the health scores 116 of the dependent services. Additionally, the further away a dependent service is from the service, the lower the weight that the risk-cause component 122 may provide to the health score 116 for that component. This is because the risk-cause component 122 may determine that services that are closer in dependency to the service will provide the most risk to the service when problems occur.

In some examples, when using the health scores 116 of the dependent services, the risk-score component 122 may use the health scores 116 for a threshold number of the dependent service(s). For example, if the service includes ten upstream dependent services and ten downstream dependent services, then the risk-score component 122 may use the health scores 116 for a threshold number of the upstream services (e.g., the three closest) and/or the health scores 116 for a threshold number of the downstream services (e.g., the three closest). Again, this may be because the risk-score component 122 determines that other services that are closer in dependency to the service will provide the most impact for problems that may occur with the service. Additionally, while these are just a couple example techniques of how the risk-score component 122 may determine the risk score 124, in other examples, the risk-score component 122 may determine the risk score 124 using additional and/or alternative techniques.

In some examples, the risk-score component 122 may determine the risk scores 124 using a range. For example, the risk-score component 122 may use a range between 0 and 100, where a risk score 124 of 100 indicates a high probability that a service could experience problems, a risk score 124 of 0 indicates a low probability that the service could experience problems, and a risk score 124 between 0 and 100 indicates a probability that is between the high probability and the low probability. However, in other examples, the risk-score component 122 may use a different range for the risk score 124 (e.g., 0 to 1,000). Additionally, in some examples, the risk-score component 122 may use a different type of indicator for the risk scores 124. For example, the risk-score component 122 may represent the risk scores 124 using colors, where green indicates a high probability that a service could experience problems, red indicates a low probability that the service could experience problems, and a color between green and red indicates a probability that is between the high probability and the low probability.

A root-cause component 126 of the system(s) 110 may be configured to determine root-cause scores 128 associated with one or more of the services using the health scores 116 and the dependencies between services. As described herein, a root-cause score 128 may indicate a probability and/or likelihood that the service is the cause for problem(s) that are occurring, such as with other dependent services (e.g., downstream dependent services). For example, a first service may include a high health score 116 (e.g., 99), a second service that depends from the first service may include a medium health score 116 (e.g., 50), a third service that depends from the second service may include medium health score 116 (e.g., 50), and a fourth service that depends from the third service may include a low health score 116 (e.g., 10). As such, even though the second service includes the medium health score 116, the root-cause score 128 associated with the second service may indicate that there is a high probability that the second service is the cause of the downstream problems for the third service and/or the fourth service based on the health scores 116 associated with the services.

Figure 3B:
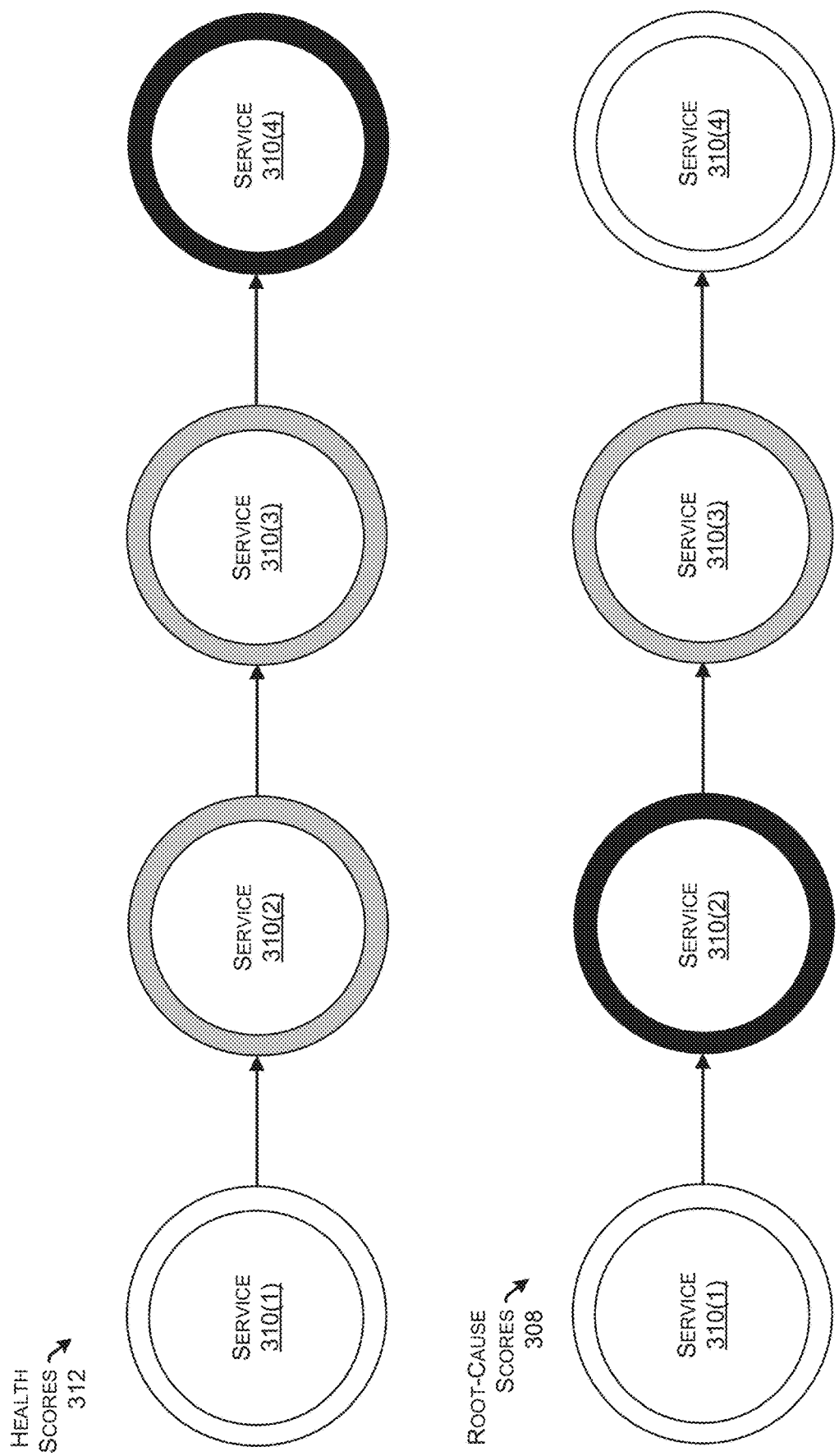
FIG. 3B illustrates an example of determining root-cause scores associated with services, in accordance with the present concepts.

The root-cause component 126 may perform one or more techniques to determine the root-cause score 128 using the health scores 116 and the dependencies (which is illustrated in the example of FIG. 3B). For a first example, the root-cause component 126 may determine the root-cause score 128 using an average of the health scores 116 for the service and the dependent services. For instance, and using the example above, the root-cause component 126 may determine the root-cause score 128 for the second service using an average health score of 52.25. For a second example, the root-cause component 126 may determine the root-cause score 128 using the lowest health score 116, the highest health score 116, and/or the like among the health scores 116 for the service and the dependent services. For instance, and again using the example above, the root-cause component 126 may determine the root-cause score 128 for the second service using the lowest health score 116, such as 10 (e.g., the health score 116 of the fourth service that is downstream from the second service). Still, for a third example, the root-cause component 126 may determine the root-cause score 128 by weighing the health scores 116 for the service and the dependent services. For instance, the root-cause component 126 may provide more weight to the health score 116 of the service than the health scores 116 of the dependent services. Additionally, the further away a dependent service is from the service, the lower the weight that the root-cause component 126 may provide to the health score 116. This is because the root-cause component 126 may determine that services that are closer in dependency to the service will be more impacted by problems that are occurring with the service. They will wrists that.

In some examples, the root-cause component 126 may determine the root-cause scores 128 using a range. For example, the root-cause component 1226 may use a range between 0 and 100, where a root-cause score 128 of 100 indicates a high probability that a service is the cause of downstream (and/or upstream) problems, a root-cause score 128 of 0 indicates a low probability that the service is the cause of downstream (and/or upstream) problems, and a root-cause score 128 between 0 and 100 indicates a probability that is between the high probability and the low probability. However, in other examples, the root-cause component 126 may use a different range for the root-cause score 128 (e.g., 0 to 1,000). Additionally, in some examples, the root-cause component 126 may use a different type of indicator for the root-cause scores 128. For example, the root-cause component 126 may represent the root-cause scores 128 using colors, where green indicates a high probability that a service is the cause of downstream (and/or upstream) problems, red indicates a low probability that the service is the cause of downstream (and/or upstream) problems, and a color between green and red indicates a probability that is between the high probability and the low probability.

Figure 4A:
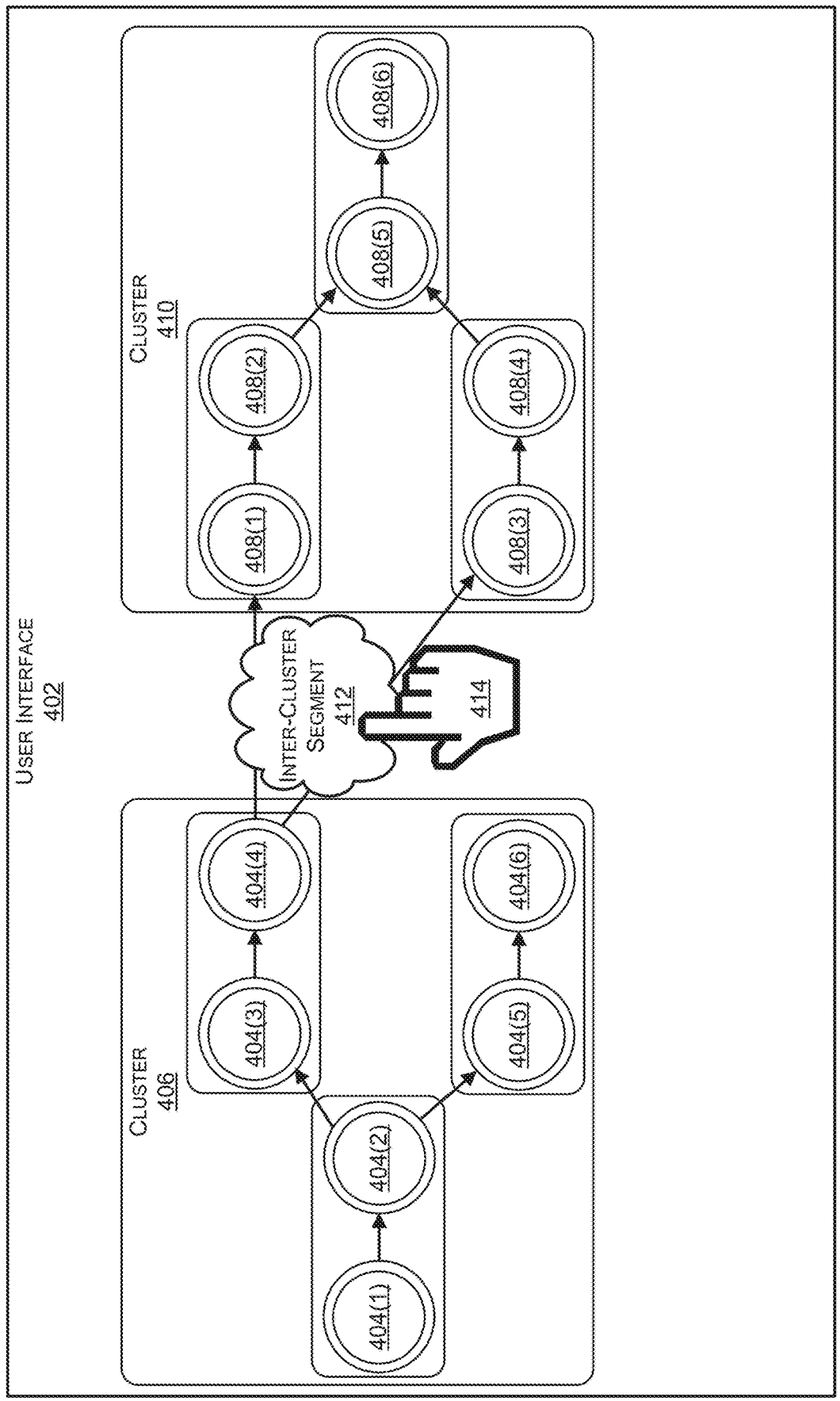
FIGS. 4A-4B illustrate an example of providing inter-cluster segment information associated with a network, in accordance with examples of the present concepts.
Figure 4B:
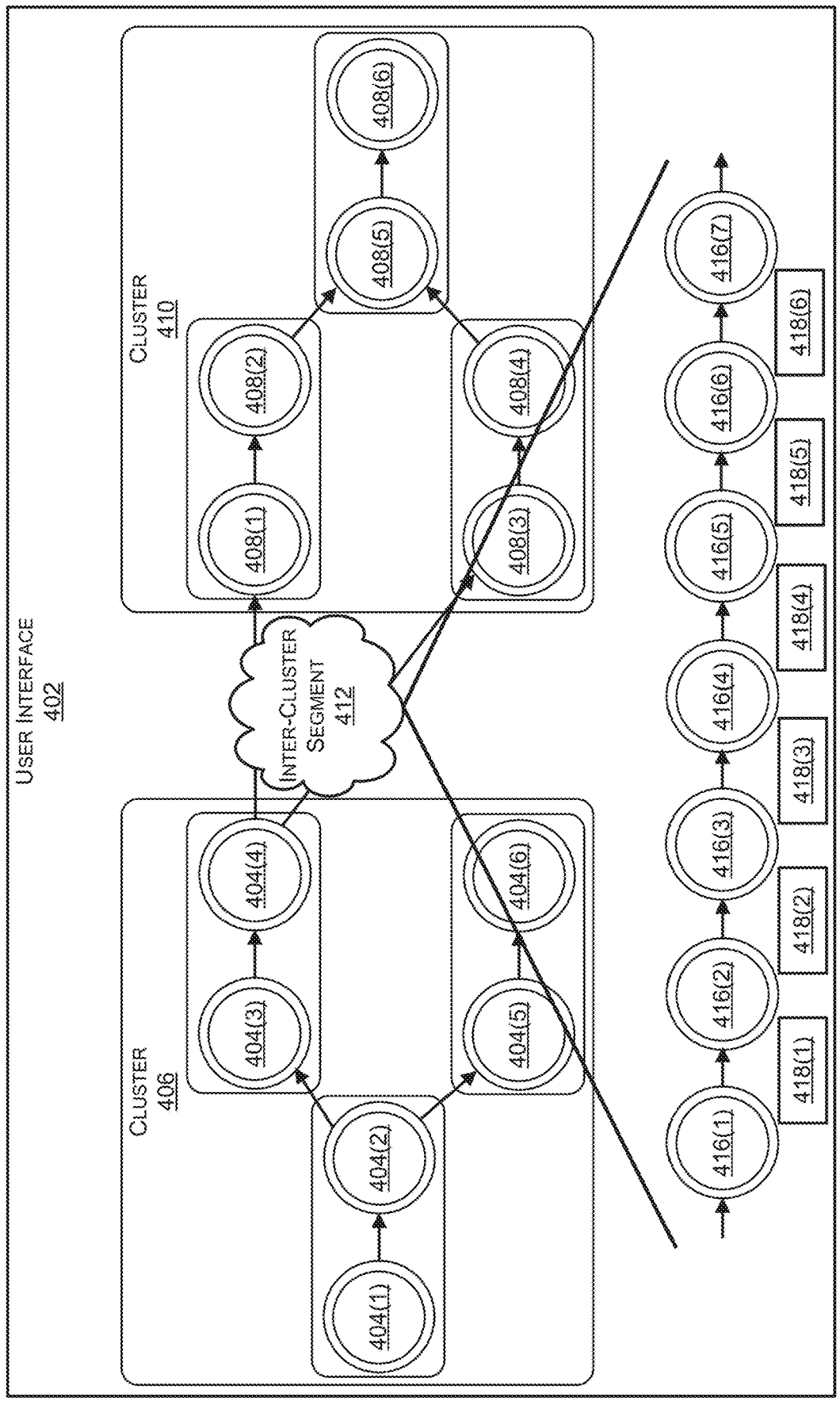

A dependency component 130 of the system(s) 110 may be configured to determine dependencies between services (e.g., determine service topologies). For example, the dependency component 130 may include a microservice management tool, such as SMM, that determines the dependencies of services. In some examples, the dependency component 130 may be configured to determine the dependencies across clusters. Additionally, in some examples, the dependency component 130 may be configured to determine the dependencies between services that are interconnected across the clusters via a network (also referred to as the "inter-cluster segment," which is illustrated in the example of FIGS. 4A and 4B).

For example, the dependency component 130 may be configured to generate and/or assign identifier(s) for one or more services, where the identifiers are represented by identifier data 132. The dependency component 130 may then be configured to inject the identifier(s) into a network header. In some examples, the dependency component 130 may further inject signaling that indicates the start and end of the microservice and/or metadata associated with the service. In some examples, the dependency component 130 injects the identifier, the signaling, and/or the metadata using a sidecar proxy agent. In some examples, the dependency component 130 injects the identifier, the signaling, and/or the metadata into different layers. For example, the dependency component 130 may inject the signaling into the third layer and inject the identifier and/or the metadata into the fourth layer.

An analysis component 134 of the system(s) 110 may then export, store, and/or analyze the identifier and/or the metadata in order to determine information about the inter-cluster segment. For example, the analysis component may include an exporter component that (e.g., NetFlow Exporter) that exports the identifier and/or the metadata. The analysis component 134 may further includes a collector component (e.g., NetFlow Collector) that collects identifier and/or the metadata. Finally, the analysis component 134 may include an analyzer component (e.g., NetFlow Analyzer) that analyzes the identifier and/or the metadata in order to determine information 136 about the inter-cluster segment. The information 136 may include at least the dependency information associated with the services and/or devices included in the inter-cluster segment and/or performance information. As described herein, the performance information may include one or more KPIs, such as the latencies associated with the services.

For example, an IP flow may be exported from one or more network devices. The analysis component 134 may determine information about the flow, such as a source of the flow (e.g., source IP address), a destination of the flow (e.g., destination IP address), a source port, a destination port, the Layer 4 Protocol, the service associated with the flow, and/or the like. The analysis component 134 may then trace the service across the network infrastructure in order to perform a hop-by-hop analysis of the flow. Based on the hop-by-hop analysis, the analysis component 134 may determine the latency, the packet drops, packets sent back compared to packets received, and/or the like associated with the flow. The analysis component 134 may use these determinations in order to determine the information associated with the inter-cluster segment.

Figure 2:
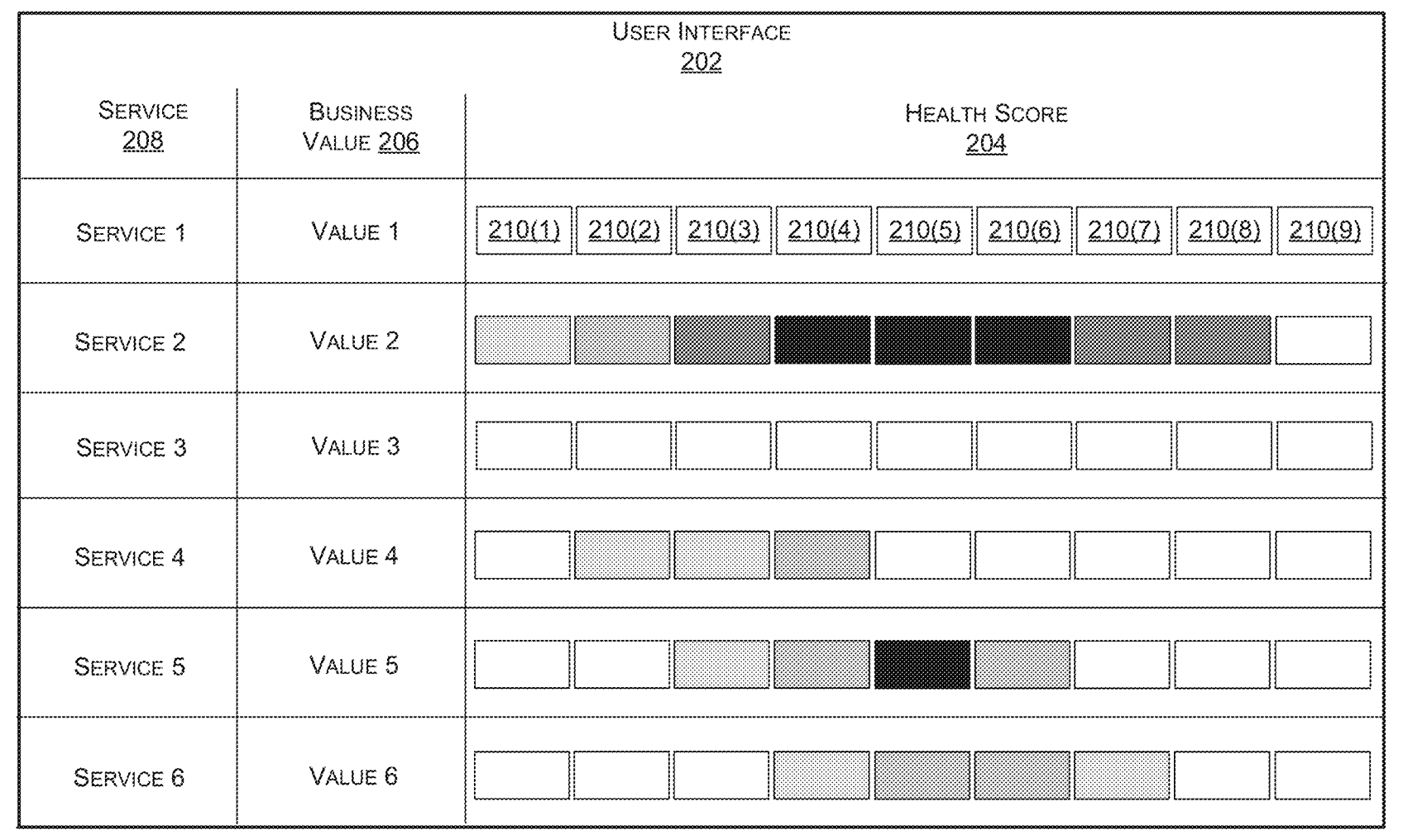

The system(s) 110 may then be configured to generate user interface(s) 138 that include at least some of the information described herein, where the user interface(s) 138 are represented by user interface data 140. For a first example, and as illustrated in the example of FIG. 2, the system(s) 110 may generate a user interface 138 that includes at least the health score(s) 116 and the business value(s) 120 associated with one or more services. For a second example, and as illustrated in the examples of FIGS. 3A-3B, the system(s) 110 may generate a user interface 138 that includes the health score(s) 116, the risk score(s) 124, and/or the root-cause score(s) 128 associated with one or more services. Still, for a third examples, and as illustrated in the examples of FIGS. 4A-4B, the system(s) 110 may be configured to generate a user interface 138 that includes the information 136 associated with the inter-cluster segment. While these are just a couple examples of user interfaces 138 that the system(s) 110 may generate, in other examples, the system(s) 110 may generate additional and/or alternative user interfaces 138 that include additional and/or alternative information.

As further illustrated in the example of FIG. 1, the system(s) 110 may include processor(s) 142, network interface(s) 144, and memory 146. As used herein, a processor may include multiple processors and/or a processor having multiple cores. Further, the processors may comprise one or more cores of different types. For example, the processors may include application processor units, graphic processing units, and so forth. In one instance, the processor may comprise a microcontroller and/or a microprocessor. The processor(s) may include a graphics processing unit (GPU), a microprocessor, a digital signal processor or other processing units or components known in the art. Alternatively, or in addition, the functionally described herein can be performed, at least in part, by one or more hardware logic components. For example, and without limitation, illustrative types of hardware logic components that can be used include field-programmable gate arrays (FPGAs), application-specific integrated circuits (ASICs), application-specific standard products (ASSPs), system-on-a-chip systems (SOCs), complex programmable logic devices (CPLDs), etc. Additionally, each of the processor(s) may possess its own local memory, which also may store program components, program data, and/or one or more operating systems.

Memory may include volatile and nonvolatile memory, removable and non-removable media implemented in any method or technology for storage of information, such as computer-readable instructions, data structures, program component, or other data. The memory includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, RAID storage systems, or any other medium which can be used to store the desired information and which can be accessed by a computing device. The memory may be implemented as computer-readable storage media ("CRSM"), which may be any available physical media accessible by the processor(s) to execute instructions stored on the memory. In one basic instance, CRSM may include random access memory ("RAM") and Flash memory. In other instances, CRSM may include, but is not limited to, read-only memory ("ROM"), electrically erasable programmable read-only memory ("EEPROM"), or any other tangible medium which can be used to store the desired information and which can be accessed by the processor(s).

Further, functional components may be stored in the respective memories, or the same functionality may alternatively be implemented in hardware, firmware, application specific integrated circuits, field programmable gate arrays, or as a system on a chip (SoC). In addition, while not illustrated, each respective memory discussed herein may include at least one operating system (OS) component that is configured to manage hardware resource devices such as the network interface(s), the I/O devices of the respective apparatuses, and so forth, and provide various services to applications or components executing on the processors. Such OS component may implement a variant of the FreeBSD operating system as promulgated by the FreeBSD Project; other UNIX or UNIX-like variants; a variation of the Linux operating system as promulgated by Linus Torvalds; the FireOS operating system from Amazon.com Inc. of Seattle, Washington, USA; the Windows operating system from Microsoft Corporation of Redmond, Washington, USA; LynxOS as promulgated by Lynx Software Technologies, Inc. of San Jose, California; Operating System Embedded (Enea OSE) as promulgated by ENEA AB of Sweden; and so forth.

Network Interface(s) may enable communication of data between the devices. The network interface(s) may include one or more network interface controllers (NICs) or other types of transceiver devices to send and receive messages over the network(s). For instance, each of the network interface(s) may include a personal area network (PAN) component to enable messages over one or more short-range wireless message channels. For instance, the PAN component may enable messages compliant with at least one of the following standards IEEE 802.15.4 (ZigBee), IEEE 802.15.1 (Bluetooth), IEEE 802.11 (WiFi), or any other PAN message protocol. Furthermore, each of the network interface(s) may include a wide area network (WAN) component to enable message over a wide area network.

As described above, the system(s) 110 may generate various user interfaces 138 that include information about one or more services. For instance, FIG. 2 illustrates an example of a user interface 202 that includes health scores 204 and business values 206 associated with services 208, in accordance with the present concepts. As shown, the user interface 202 is configured such that each row of the user interface 202 includes information about a service 208. For instance, the first row of the user interface 202 includes an identifier of the first service 208 (e.g., Service 1), the business value 206 of the first service 208 (e.g., Value 1), and the health score 204 of the first service 208 (represented by the rectangles), the second row of the user interface 202 includes an identifier of the second service 208 (e.g., Service 2), the business value 206 of the second service 208 (e.g., Value 2), and the health score 204 of the second service 208 (represented by the rectangles), the third row of the user interface 202 includes an identifier of the third service 208 (e.g., Service 3), the business value 206 of the third service 208 (e.g., Value 3), and the health score 204 of the third service 208 (represented by the rectangles), and/or so forth.

In the example of FIG. 2, the health scores 204 are represented over a period of time, such as one minute, one hour, one day, one week, and/or any other period of time. Additionally, the health scores 204 are broken into different segments 210(1)-(9) (although only the segments for the first service 208 are labeled for clarity reasons), where each segment 210 represents a portion of the period of time. For example, if the period of time includes nine days, then each segment 210 may represents one day. Additionally, in the example of FIG. 2, the health scores 204 are represented by different colors. For example, a white box may represent a high health score 204 (e.g., a healthy service 208), a black box may represent a low health score 204 (e.g., an unhealthy service 208), and shading between the white and the black may represent health scores 204 that are between the high health score 204 and the low health score 204. However, in other examples, the health scores 204 may be represented using any other type of content, such as numerical values.

In the example of FIG. 2, a user may use the user interface 202 in order to prioritize the services 208. For example, the user interface 202 indicates that the second service 208 includes the lowest health scores 204, the fifth service 208 includes the second lowest health scores 204, the sixth service 208 includes the third lowest health scores 204, the fourth service 208 includes the fourth lowest health scores 204, and the rest of the services 208 includes the highest health scores 204. As such, a user may initially prioritize the second service 208, followed by the fifth service 208, followed by the sixth service 208, and finally followed by the fourth service 208.

However, in some examples, the user may also use the business values 206 when prioritizing the services 208. For example, if the fifth service 208 includes the greatest business value 206, then the user may prioritize the fifth service 208 before the second service 208 even though the second service 208 includes lower health scores 204 than the fifth service 208. This is because the user may determine that problems that occur with the fifth service 208 are a greater cost than problems that occur with the second service 208. In other words, the user interface 202 allows the user to analyze both the health scores 204 and the business values 206 when prioritizing the services 208.

In some examples, in addition to, or alternatively from, the user determining the priorities, the system(s) 110 may also determine the priorities for the services using the health scores 204 and the business values 206. For a first example, the system(s) 110 may determine the priorities based on the health scores 204, where the system(s) 110 determine that the second service 208 with the lowest health scores 204 is prioritized first, followed by the fifth service 208 with the second lowest health scores 204, followed by the sixth service 208 with the third lowest health score 204, and/or so forth. For a second example, the system(s) 110 may determine the priorities based on the business values 206, where the system(s) determine that service 208 with a highest business value 206 is prioritized first, followed by a service 208 with the second highest business value 206, followed by a service 208 with the third highest business value 206, and/or so forth. Still, for a third example, the system(s) 110 may determine the priorities for the services 208 using a combination of the health scores 204 and the business values 206. For instance, the system(s) 110 may use the health scores 204 and the business values 206 to prioritize the services in such a way that minimizes a loss that may occur from problems with the services 208.

While the example of FIG. 2 illustrates the user interface 202 as presenting the health scores 204 and the business values 206 for the services 208 using rows, in other examples, the user interface 202 may present the health scores 204 and/or the business values 206 using one or more additional and/or alternative techniques.

As described above, the system(s) 110 may also determine risk scores and root-cause scores associated with one or more of the service. For instance, FIG. 3A illustrates an example of determining the risk scores 302 associated with services 304(1)-(4) (also referred to as "services 304"), in accordance with the present concepts. In the example of FIG. 3A, the system(s) 110 may initially determine health scores 306 associated with the services 304. As shown, the system(s) 110 may determine the first service 304(1) includes a high health score 306 (which is represented by the white boundary), the second service 304(2) includes a low health score 306 (which is represented by the black boundary), the third service 304(3) includes a low health score 306 (which is also represented by the black boundary), and the fourth service 304(4) includes a medium health score 306 (which is represented by the grey boundary). While the health scores 306 in the example of FIG. 3A are represented by different shaded boundaries, in other examples, the health scores 306 may be represented using any other technique, such as numerical values.

The system(s) 110 (e.g., the risk-score component 122) may then use the health scores 306 in order to determine the risk scores 302 for the services 304. In the example of FIG. 3A, the system(s) 110 may determine that the first service 304(1) includes a high risk score 302 (which is represented by the black boundary) even though the first service 304(1) also includes a high health score 306. The system(s) 110 may make such a determination based on the health scores 306 associated with one or more of the services 304(2)-(4). For instance, and as illustrated in the example of FIG. 3A, the system(s) 110 may determine the risk score 302 for the first service 304(1) using the lowest health score 306 among the services 304 since the services 304(2)-(4) depend from the first service 304(1) (e.g., the services 304(2)-(4) are downstream from the first service 304(1)). However, in other examples, the system(s) 110 may determine the risk score 302 for the first service 304(1) using one or more additional and/or alternative techniques. For example, the system(s) 110 may determine the risk score 302 for the first service 304(1) using the average of the health scores 306 for the services 304.

The system(s) 110 (e.g., the risk-score component 122) may also use the health scores 306 in order to determine the risk scores 302 for the other services 304(2)-(4). In the example of FIG. 3A, the system(s) 110 may determine that the second service 304(2) also includes a high risk score 302 (which is represented by the black boundary). The system(s) 110 may make such a determination based on the health scores 306 associated with one or more of the services 304. For instance, and as illustrated in the example of FIG. 3A, the system(s) 110 may determine the risk score 302 for the second service 304(2) using the lowest health score 306 among the services 304(2)-(4) (which is the health score 306 of the second service 304(2)) since the services 304(3)-(4) depend from the second service 304(2) (e.g., the services 304(3)-(4) are downstream from the second service 304(2)). As such, the health of the services 304(3)-(4) may have an impact on the health of the second service 304(2). However, in other examples, the system(s) 110 may further use the health score 306 of the upstream service 304(1) when determining the risk score 302 of the second service 304(2).

Additionally, in the example of FIG. 3A, the system(s) 110 may determine that the third service 304(3) includes a medium risk score 302 (which is represented by the grey boundary). The system(s) 110 may make such a determination based on the health scores 306 associated with one or more of the services 304. For example, and as illustrated in the example of FIG. 3A, the system(s) 110 may determine the risk score 302 for the third service 304(3) using the lowest health score 306 among the services 304(3)-(4) (which is the health score 306 of the fourth service 304(4)) since the fourth service 304(4) depends from the third service 304(3) (e.g., the fourth service 304(4) is downstream from the third service 304(3)). As such, the health of the fourth service 304(4) may have an impact on the health of the third service 304(3). However, in other examples, the system(s) 110 may further use the health scores 306 of the upstream services 304(1)-(2) when determining the risk score 302 of the third service 304(3).

Furthermore, in the example of FIG. 3A, the system(s) 110 may determine that the fourth service 304(4) includes a medium risk score 302 (which is represented by the grey boundary). The system(s) 110 may make such a determination based on the health scores 306 associated with one or more of the services 304. For instance, and as illustrated in the example of FIG. 3A, the system(s) 110 may determine the risk score 302 for the fourth service 304(4) using the health score 306 for the fourth service 304(4) since no other service 304 is dependent from the fourth service 304(4) (e.g., no other service 304 is downstream from the fourth servicer 304(4)). As such, the health of the other services 304 may not have an impact on the health of the fourth service 304(4). However, in other examples, the system(s) 110 may further use the health scores 306 of the upstream services 304(1)-(3) when determining the risk score 302 of the fourth service 304(4).

In some examples, the system(s) 110 may then generate a user interface 138 that includes information about the health scores 306 and the risk scores 302 for the services 304. For example, the user interface 138 may include the illustrations that show the health scores 306 and the risk scores 302, as represented in the example of FIG. 3A. However, in other examples, the user interface 138 may provide the health scores 306 and/or the risk scores 302 using additional and/or alternative techniques, such as using numerical values.

FIG. 3B illustrates an example of determining the root-cause scores 308 associated with services 310(1)-(4) (also referred to as "services 310"), in accordance with the present concepts. In the example of FIG. 3B, the system(s) 110 may initially determine health scores 312 associated with the services 310. As shown, the system(s) 110 may determine the first service 310(1) includes a high health score 312 (which is represented by the white boundary), the second service 310(2) includes a medium health score 312 (which is represented by the grey boundary), the third service 310(3) includes a medium health score 312 (which is also represented by the grey boundary), and the fourth service 310(4) includes a low health score 312 (which is represented by the black boundary). While the health scores 312 in the example of FIG. 3B are represented by different shaded boundaries, in other examples, the health scores 312 may be represented using any other technique, such as numerical values.

The system(s) 110 (e.g., the root-cause component 126) may then use the health scores 312 in order to determine the root-cause scores 308 for the services 310. In the example of FIG. 3B, the system(s) 110 may determine that the first service 310(1) includes a low root-cause score 308 (which is represented by the white boundary). The system(s) 110 may make such a determination based on the health scores 312 associated with one or more of the services 310. For example, and as illustrated in the example of FIG. 3B, the system(s) 110 may determine that the root-cause score 308 for the first service 304(1) includes the low root-cause score 308 since the first service 310(1) includes a high health score 312. As such, the system(s) 110 may determine that the first service 310(1) is likely not causing the problems with the downstream services 310(2)-(4).

Additionally, the system(s) 110 may determine that the second service 310(2) includes a high root-cause score 308 (which is represented by the black boundary). The system(s) 110 may make such a determination based on the health scores 312 associated with one or more of the services 310. For example, and as illustrated in the example of FIG. 3B, the system(s) 110 may determine that the second service 304(2) includes the high root-cause score 308 since the second service 310(2) includes the medium health score 312, the third service 310(3) that depends from the second service 310(2) includes the medium health score 312, and the fourth service 310(4) that depends from the third service 310(3) includes the low health score 312. As such, the system(s) 110 may determine that the problems are caused by the second service 310(2). As such, the system(s) 110 may determine that a main cause for the problems associated with the overall performance of the services 310 is the second service 310(2).

Furthermore, the system(s) 110 may determine that the third service 310(3) includes a medium root-cause score 308 (which is represented by the grey boundary). The system(s) 110 may make such a determination based on the health scores 312 associated with one or more of the services 310. For example, and as illustrated in the example of FIG. 3B, the system(s) 110 may determine that the third service 304(3) includes the medium root-cause score 308 since the third service 310(3) includes the medium health score 312, the fourth service 310(4) that depends from the third service 310(3) includes the low health score 312, and the second service 310(2) for which the third service 310(3) depends includes the medium health score 312 and/or the high root-cause score 308. As such, the system(s) 110 may determine that the problems are more likely caused the second service 310(2) than the third service 310(3). However, the system(s) 110 may still determine that the third service 310(3) is causing some of the problems associated with the overall performance of the services 310.

Moreover, the system(s) 110 may determine that the fourth service 310(4) includes a low root-cause score 308 (which is represented by the white boundary). The system(s) 110 may make such a determination based on the health scores 312 associated with one or more of the services 310. For example, and as illustrated in the example of FIG. 3B, the system(s) 110 may determine that the fourth service 304(4) includes the low root-cause score 308 even though the fourth service 310(4) includes the low health score 312 since the second service 310(4) that is upstream from the fourth service 310(4) includes the medium health score 312 and/or the high root-cause score 308 and the third service 310(3) that is also upstream from the fourth service 310(4) includes the medium health score 312 and/or the medium root-cause score 308. As such, the system(s) 110 may determine that the problems that the fourth service 310(4) is experiencing are caused by problems associated with the second service 310(2) and the third service 310(3). Because of that, the system(s) 110 may determine that the fourth service 310(4) is not the cause of the problems associated with the overall performance of the services 310.

In some examples, the system(s) 110 may then generate a user interface 138 that includes information about the health scores 312 and the root-cause scores 308 for the services 310. For example, the user interface 138 may include the illustrations that show the health scores 312 and the root-cause scores 308, as represented in the example of FIG. 3B. However, in other examples, the user interface 138 may provide the health scores 312 and/or the root-cause scores 308 using additional and/or alternative techniques, such as using numerical values. Additionally, in some examples, the system(s) 110 may generate the user interface 138 to further include risk scores associated with the services 310.

FIGS. 4A-4B illustrate an example of providing inter-cluster segment information associated with a network, in accordance with examples of the present concepts. As shown by the example of FIG. 4A, a user interface 402 may initially include dependencies (represented by the arrows) for services 404(1)-(6) (also referred to as "services 404") associated with a cluster 406 and dependencies (also represented by arrows) for services 408(10-(6) (also referred to as "services 408") associated with a cluster 410. However, the user interface 402 does not initially include information for the inter-cluster segment associated with the network for which the service 404(4) communicates with at least the service 408(1) and the service 408(3) via a network.

Instead, the user interface 402 includes an interface element 412 that a user 414 is able to select in order to view the information associated with the inter-cluster segment. For example, and as illustrated in FIG. 4B, when the user 414 selects the interface element 412, the user interface 402 may provide the information associated with the inter-cluster segment. As shown, the user interface 402 includes at least dependencies (also represented by the arrows) of services 416(1)-(7) (and/or devices) (also referred to as "services 416") associated with the inter-cluster segment and performance information 418(1)-(6) (also referred to as "performance information 418") associated with the services 416. In the example of FIG. 4B, the performance information 418 may include latencies associated with sending data between the services 416. However, in other examples, the performance information 418 may include any other type of KPI information.

Although the example of FIGS. 4A-4B shows presented the information associated with the inter-cluster segment along with the information associated with the clusters 406, 410, in other examples, the user interface 402 may only present the information associated with the inter-cluster segment when the interface element 412 is selected.

Figure 5:
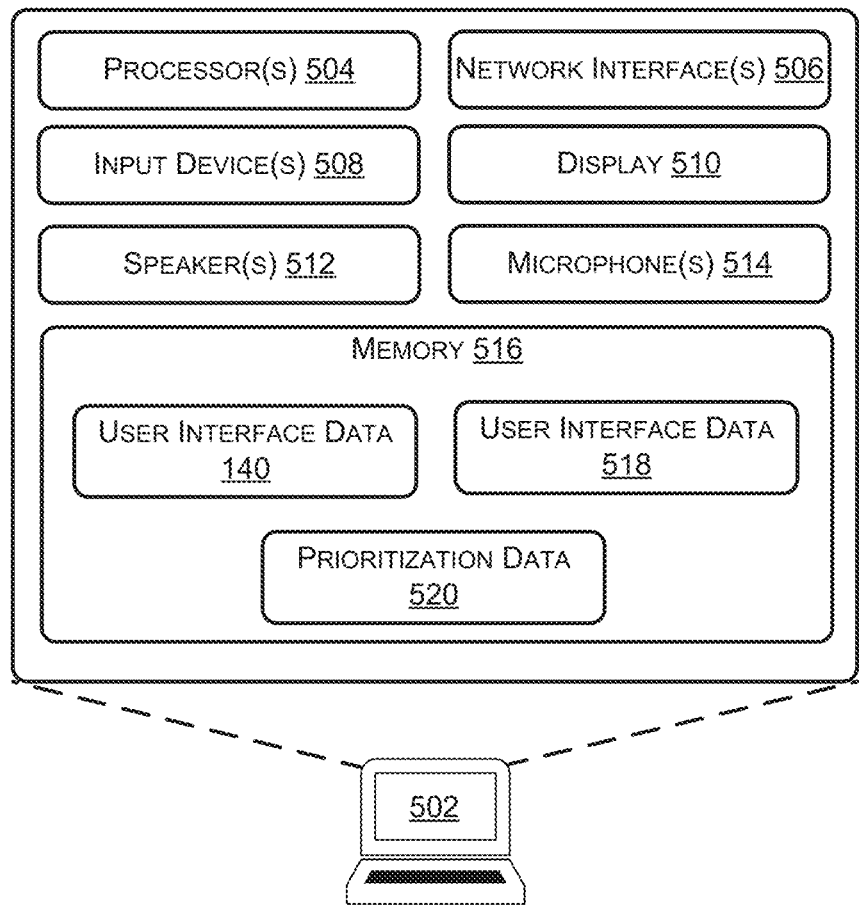
FIG. 5 illustrates example components of a user device, in accordance with the present concepts.

FIG. 5 illustrates example components of a user device 502 (which may represent, and/or include, one of the user devices 104), in accordance with present concepts. As shown, the user device 502 includes processor(s) 504, network interface(s) 506, input device(s) 508, a display 510, speaker(s) 512, microphone(s) 514, and memory 516. In some examples, the user device 502 may include one or more additional components not illustrated in the example of FIG. 5. Additionally, or alternatively, in some examples, the user device 502 may not include one or more of the input device(s) 508, the speaker(s) 512, or the microphone(s) 514.

In the example of FIG. 5, the user device 502 may receive the user interface data 140 from the system(s) 110, where the user interface data 140 represents one or more of the user interfaces described herein. The user device 502 may then use the user interface data 140 to display, on the display 510, one or more of the user interfaces. Additionally, the user device 502 may generate input data 518 representing inputs received by the user device 502. As described herein, in some examples, the inputs may be for prioritizing services. For example, while displaying the user interface 202, the user device 502 may receive inputs for prioritizing the services 208. In some examples, the user device 502 may then generate prioritization data 520 representing the priorities for the services. Additionally, the user device 502 may send the prioritization data 520 to the system(s) 110 for processing.

Figure 6:
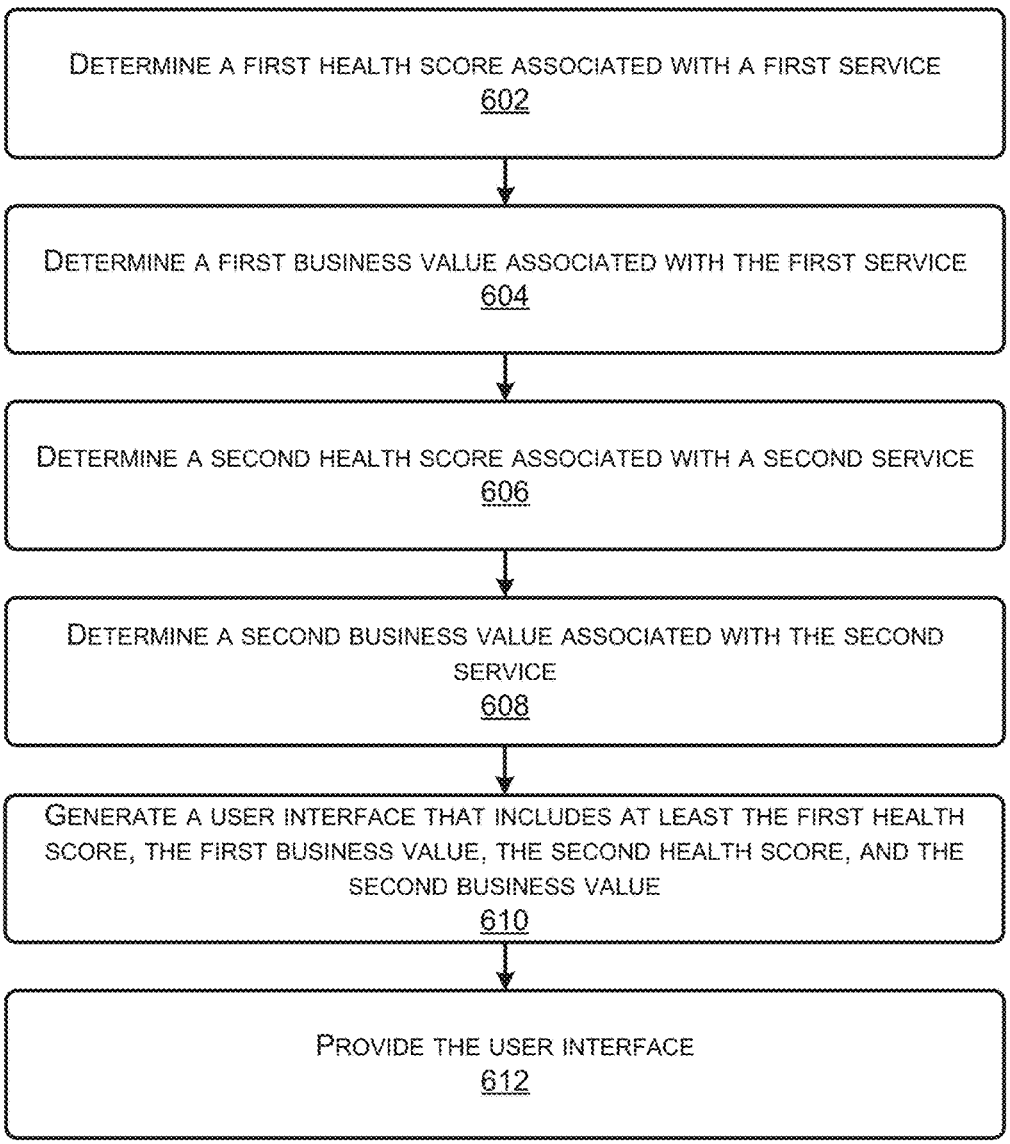
FIG. 6 illustrates a flow diagram of an example process for providing business values with health scores for services, in accordance with the present concepts.

FIG. 6 illustrates a flow diagram of an example process 600 for providing business values with health scores for services, in accordance with the present concepts. An operation 602 represents determining a first health score associated with a first service and an operation 604 represents determining a first business value associated with the first service. For instance, the system(s) 110 may determine the first health score associated with the first service. In some examples, the system(s) 110 determine the first health score using first KPIs associated with the first service. Additionally, in some examples, the system(s) 110 may use one or more microservice management tools to determine the first health score. The system(s) 110 may also determine the first business value associated with the first service. In some examples, the system(s) 110 determine the first business value using one or more APM agents. As described herein, the first business value associated with the first service may include, but is not limited to, a first revenue, a first cost, a first worth of a first transaction, and/or any other type of business value.

An operation 606 represents determining a second health score associated with a second service and an operation 608 represents determining a second business value associated with the second service. For instance, the system(s) 110 may determine the second health score associated with the second service. In some examples, the system(s) 110 determine the second health score using second KPIs associated with the second service. Additionally, in some examples, the system(s) 110 may use the one or more microservice management tools to determine the second health score. The system(s) 110 may also determine the second business value associated with the second service. In some examples, the system(s) 110 determine the second business value using the one or more APM agents. As described herein, the second business value associated with the second service may include, but is not limited to, a second revenue, a second cost, a second worth of a second transaction, and/or any other type of business value.

An operation 610 represents generating a user interface that includes at least the first health score, the first business value, the second health score, and the second business value. For instance, the system(s) 110 may generate the user interface. In some examples, the user interface includes rows, where the first row includes at least a first identifier of the first service, the first health score, and the first business value, and a second row includes at least a second identifier of the second service, the second health score, and the second business value. However, in other examples, the user interface may include the information in a different format than rows. Additionally, in some examples, the user interface may include health scores and business values for more than two services.

An operation 612 represents providing the user interface. For instance, the system(s) 110 may send the user interface to a user device so that the user device is able to display the user interface to a user. The user is then able to use both the health scores and the business values to determine priorities associated with at least the first service and the second service. For example, the user may determine to prioritize the first service when the first service includes the higher business value. For another example, the user may determine to prioritize the second service, even if the second service includes the lowest business value, based on the second health score being less than the first health score. In either of these examples, the user device may receive inputs representing the priorities and send, back to the system(s), data representing the priorities. By providing the user interface that includes both the health scores and the business values, the user may make more informed decisions when determining the priorities for the services.

Figure 7:
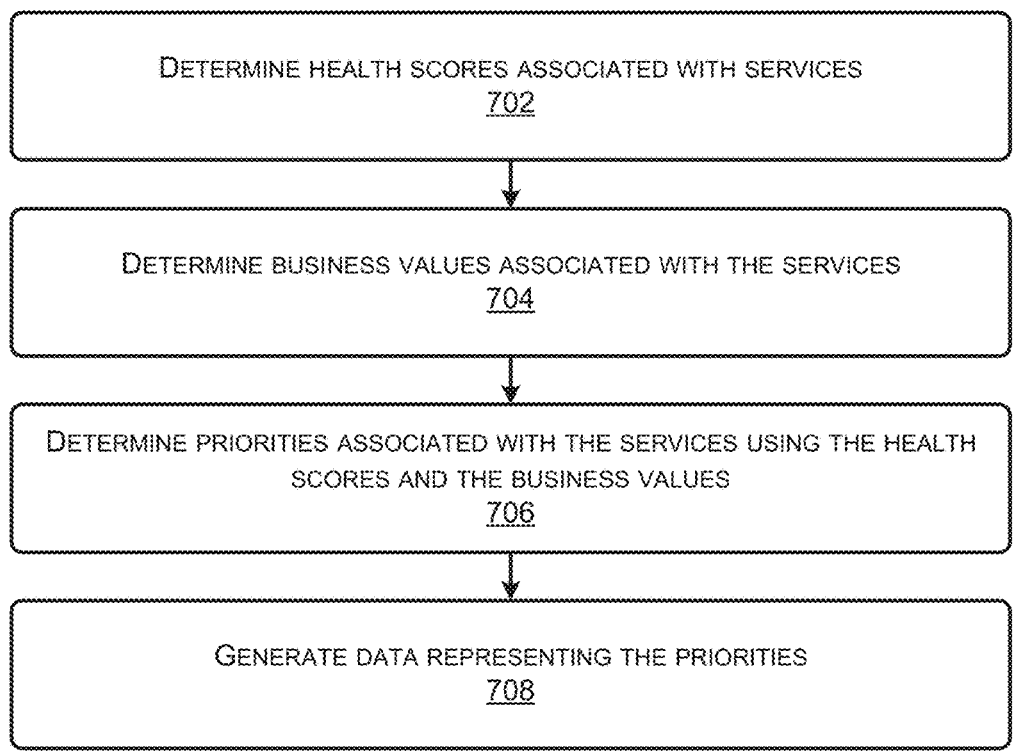
FIG. 7 illustrates a flow diagram of an example process for prioritizing services using health scores and business values associated with the services, in accordance with the present concepts.

FIG. 7 illustrates a flow diagram of an example process 700 for prioritizing services using health scores and business values associated with the services, in accordance with the present concepts. An operation 702 represents determining health scores associated with services. For instance, the system(s) 110 may determine the health scores associated with the services. In some examples, the system(s) 110 determine the health scores using KPIs associated with the services. Additionally, in some examples, the system(s) 110 may use one or more microservice management tools to determine the health stores. The services may be associated with a service mesh, where the services include one or more dependencies with one another.

An operation 704 represents determining business values associated with the services. For instance, the system(s) 110 may determine the business values associated with the services. In some examples, the system(s) 110 determine the business values using one or more APM agents. As described herein, the business values associated with the services may include, but are not limited to, revenues, costs, worth of transactions, and/or any other type of business values.

An operation 706 represents determining priorities associated with the services using the health scores and the business values and an operation 708 represents generating data representing the priorities. For instance, the system(s) 110 may determine the priorities associated with the services. In some examples, the system(s) 110 determine the priorities using input data received from a user device, where the inputs indicate the priorities. Additionally, or alternatively, in some examples, the system(s) 110 determine the priorities by analyzing the health scores and/or the business values. For a first example, the system(s) 110 may determine the priorities based on the health scores, where the system(s) 110 determine that a first service with a lowest health score is prioritized first, followed by a second service with the second lowest health score, followed by a third service with the third lowest health score, and/or so forth. For a second example, the system(s) 110 may determine the priorities based on the business values, where the system(s) 110 determine that a first service with a highest business value is prioritized first, followed by a second service with the second highest business value, followed by a third service with the third highest business value, and/or so forth.

Still, for a third example, the system(s) 110 may determine the priorities for the services using a combination of the health scores and the business values. For instance, the system(s) 110 may use the health scores and the business values to prioritize the services in such a way that minimizes a loss that may occur from problems with the services. While these are just a couple example techniques of how the system(s) 110 may determine the priorities using the health scores and the business values, in other examples, the system(s) 110 may use additional and/or alternative techniques to determine the priorities using the health scores and the business values. In any of the examples, the system(s) 110 may then generate the data representing the priorities for the services.

Figure 8:
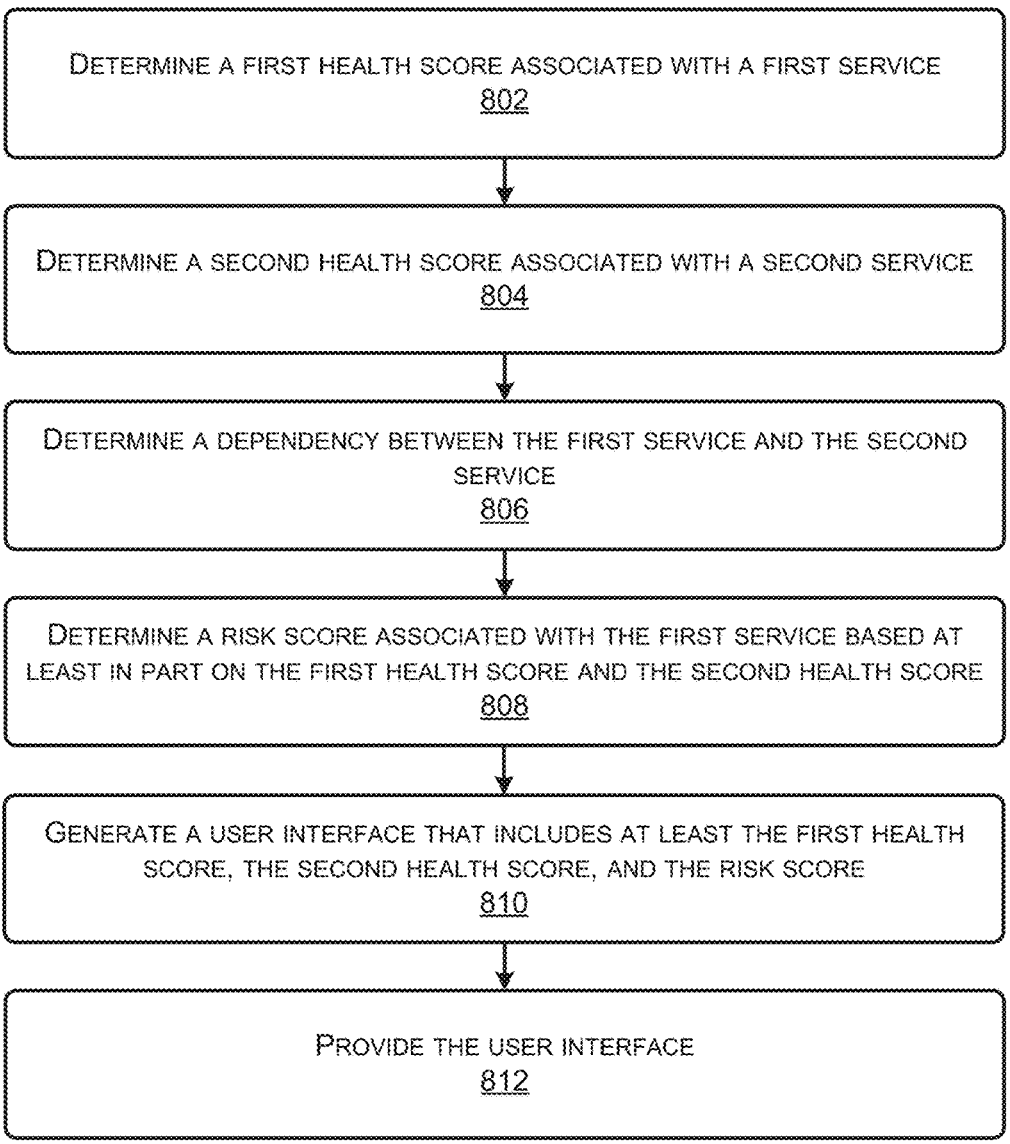
FIG. 8 illustrates a flow diagram of an example process for determining a risk score associated with a service, in accordance with the present concepts.

FIG. 8 illustrates a flow diagram of an example process 800 for determining a risk score associated with a service, in accordance with the present concepts. An operation 802 represents determining a first health score associated with a first service and an operation 804 represents determining a second health score associated with a second service. For instance, the system(s) 110 may determine the first health score associated with the first service and the second health score associated with the second service. In some examples, the system(s) 110 determine the first health score using first KPIs associated with the first service and/or determine the second health score using second KPIs associated with the second service. In some examples, the system(s) 110 may use one or more microservice management tools to determine the first health score and/or the second health score.

An operation 806 represents determining a dependency between the first service and the second service. For instance, the system(s) 110 may determine that there is a dependency between the first service and the second service. In some examples, the first service may include an upstream service from the second service while, in other examples, the first service may include a downstream service from the second service. Additionally, in some examples, the first service and the second service may include a direct dependency while, in other examples, one or more services may be interconnected between the first service and the second service.

An operation 808 represents determining a risk score associated with the first service based at least in part on the first health score and the second health score. For instance, based on the dependency between the first service and the second service, the system(s) 110 may determine the risk score using the first health score and the second health score. In some examples, the system(s) 110 may determine the risk score using an average of the first health score and the second health score. In some examples, the system(s) 110 may determine the risk score using the lowest health score among the first health score and the second health score. In some examples, the system(s) 110 may determine the risk score using the highest health score among the first health score and the second health score. Still, in some examples, the system(s) 110 may provide weight to one or more of the first health score or the second health score when determining the risk score. While these are just a couple example techniques of how the system(s) 110 may determine the risk score, in other examples, the system(s) 110 may determine the risk score using additional and/or alternative techniques.

An operation 810 represents generating a user interface that includes at least the first health score, the second health score, and the risk score and an operation 812 representing providing the user interface. For instance, the system(s) 110 may generate the user interface that includes the first health score, the second health score, and the risk score. In some examples, the user interface includes graphics representing the scores, similar to the example of FIG. 3A. The system(s) 110 may then send the user interface to a user device so that the user device is able to display the user interface to a user. The user is then able to use both the health scores and the risk score in order to determine priorities associated with at least the first service and the second service. For example, the user may determine to prioritize the service that includes the lowest health score. For another example, the user may determine to prioritize the service that includes the highest risk score. In either of these examples, the user device may receive inputs representing the priorities and send, back to the system(s), data representing the priorities.

Figure 9:
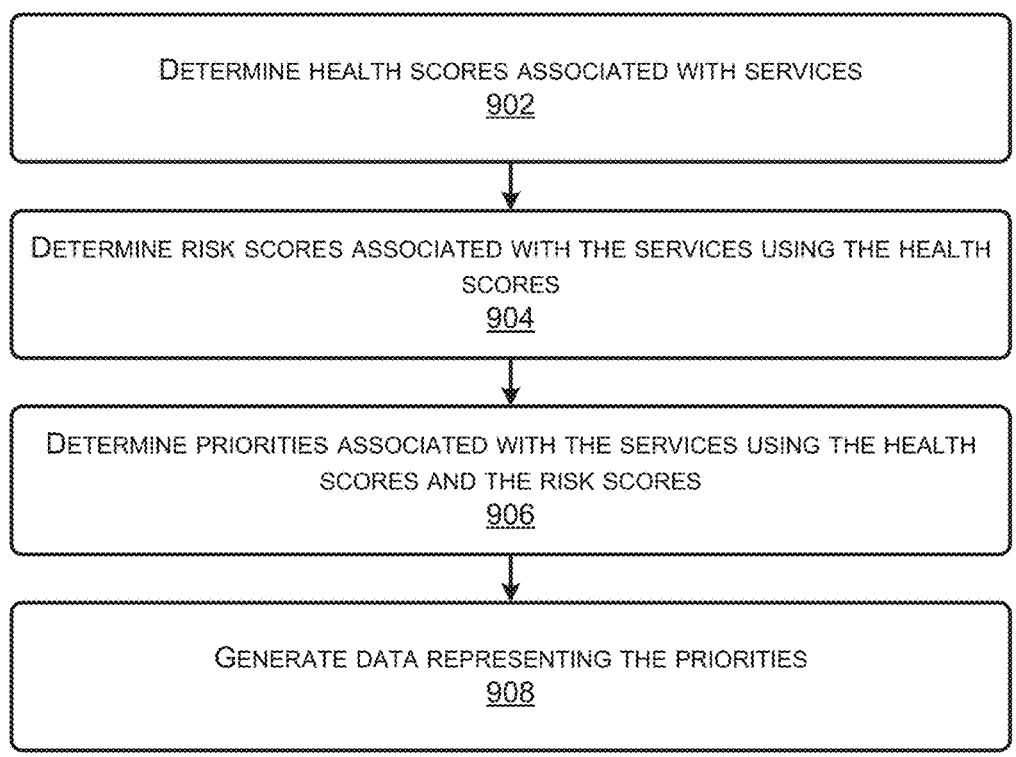
FIG. 9 illustrates a flow diagram of an example process for prioritizing services using health scores and risk scores associated with the services, in accordance with the present concepts.

FIG. 9 illustrates a flow diagram of an example process 900 for prioritizing services using health scores and risk scores associated with the services, in accordance with the present concepts. An operation 902 represents determining health scores associated with services. For instance, the system(s) 110 may determine the health scores associated with the services. In some examples, the system(s) 110 determine the health scores using KPIs associated with the services. Additionally, in some examples, the system(s) 110 may use one or more microservice management tools to determine the health stores. The services may be associated with a service mesh, where the services include one or more dependencies with one another.

An operation 904 represents determining risk scores associated with the services using the health scores. For instance, the system(s) 110 may determine the risk scores associated with the services using the health scores. For a first example, and for a service, the system(s) 110 may determine the risk score using an average of the health scores for the service and the dependent services. For a second example, and again for a service, the system(s) 110 may determine the risk score using the lowest health score from among the health scores for the service and the dependent services. Still, for a third example, and again for a service, the system(s) 110 may determine the risk score using the highest health score from among the health scores for the service and the dependent services. Additionally, in some examples, the system(s) 110 may use one or more weights when determining the risk score. For example, the system(s) 110 may use a first weight for a first health score of a first service, a second weight for a second health score of a second service, a third weight for a third health score of a third service, and/or so forth. While these are just a couple example techniques of how the system(s) 110 may determine the risk scores using the health scores, in other examples, the system(s) 110 may determine the risk scores using additional and/or alternative techniques.

An operation 906 represents determining priorities associated with the services using the health scores and the risk scores and an operation 908 represents generating data representing the priorities. For instance, the system(s) 110 may determine the priorities associated with the services. In some examples, the system(s) 110 determine the priorities using input data received from a user device, where the inputs indicate the priorities. Additionally, or alternatively, in some examples, the system(s) 110 determine the priorities by analyzing the health scores and/or the risk scores. For a first example, the system(s) 110 may determine the priorities based on the health scores, where the system(s) 110 determine that a first service with a lowest health score is prioritized first, followed by a second service with the second lowest health score, followed by a third service with the third lowest health score, and/or so forth. For a second example, the system(s) 110 may determine the priorities based on the risk scores, where the system(s) 110 determine that a first service with a highest risk score is prioritized first, followed by a second service with the second highest risk score, followed by a third service with the third highest risk score, and/or so forth.

Still, for a third example, the system(s) 110 may determine the priorities for the services using a combination of the health scores and the risk scores. For instance, the system(s) 110 may use the health scores and the risk scores to prioritize the services in such a way that minimizes a potential for problems that may occur with the services. While these are just a couple example techniques of how the system(s) 110 may determine the priorities using the health scores and the risk scores, in other examples, the system(s) 110 may use additional and/or alternative techniques to determine the priorities using the health scores and the risk scores. In any of the examples, the system(s) 110 may then generate the data representing the priorities for the services.

Figure 10:
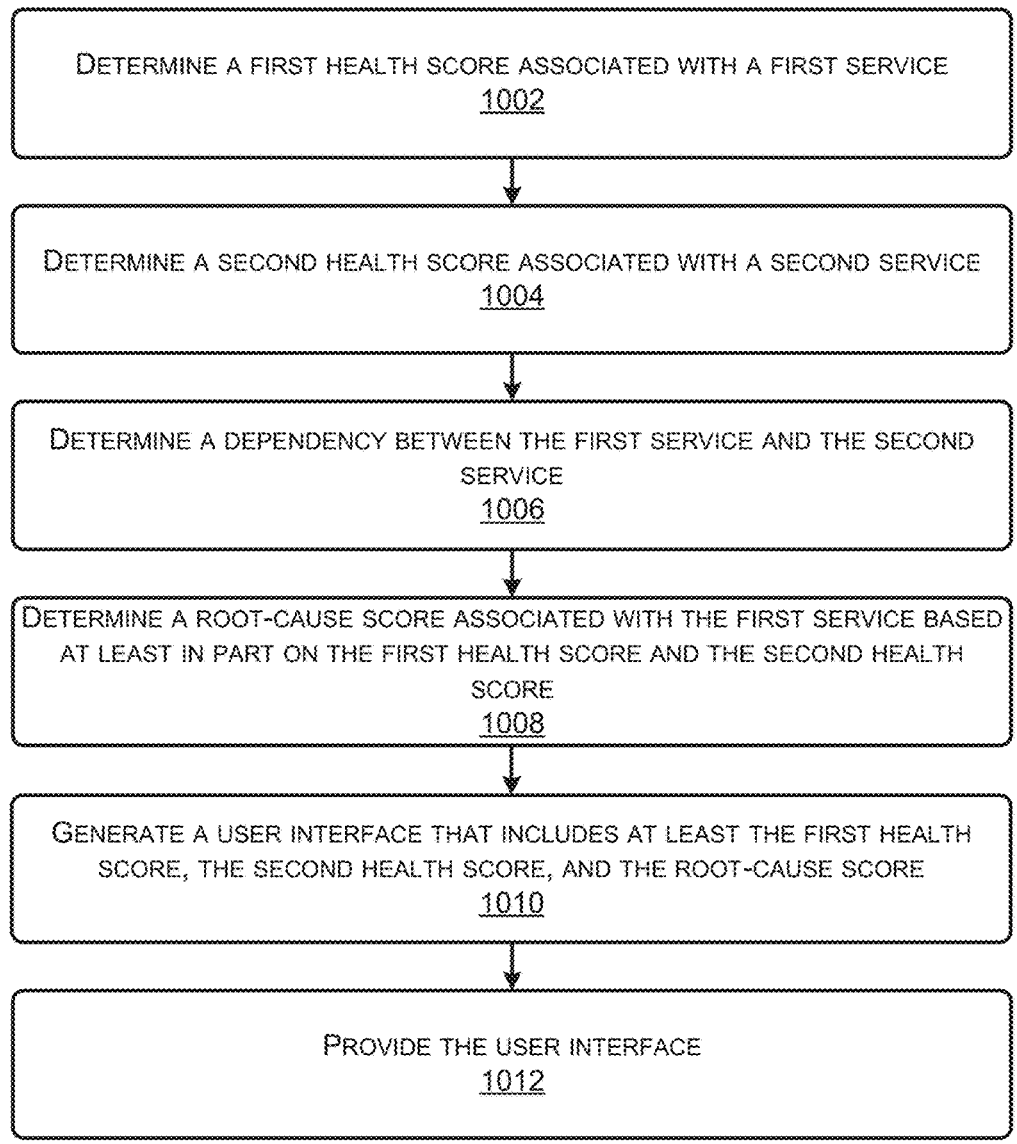
FIG. 10 illustrates a flow diagram of an example process for determining a root-cause score associated with a service, in accordance with the present concepts.

FIG. 10 illustrates a flow diagram of an example process 1000 for determining a root-cause score associated with a service, in accordance with the present concepts. An operation 1002 represents determining a first health score associated with a first service and an operation 1004 represents determining a second health score associated with a second service. For instance, the system(s) 110 may determine the first health score associated with the first service and the second health score associated with the second service. In some examples, the system(s) 110 determine the first health score using first KPIs associated with the first service and/or determine the second health score using second KPIs associated with the second service. In some examples, the system(s) 110 may use one or more microservice management tools to determine the first health score and/or the second health score.

An operation 1006 represents determining a dependency between the first service and the second service. For instance, the system(s) 110 may determine that there is a dependency between the first service and the second service. In some examples, the first service may include an upstream service from the second service while, in other examples, the first service may include a downstream service from the second service. Additionally, in some examples, the first service and the second service may include a direct dependency while, in other examples, one or more services may be interconnected between the first service and the second service.

An operation 1008 represents determining a root-cause score associated with the first service based at least in part on the first health score and the second health score. For instance, based on the dependency between the first service and the second service, the system(s) 110 may determine the root-cause score using the first health score and the second health score. In some examples, the system(s) 110 may determine the root-cause score using an average of the first health score and the second health score. In some examples, the system(s) 110 may determine the root-cause score using the lowest health score among the first health score and the second health score. In some examples, the system(s) 110 may determine the root-cause score using the highest health score among the first health score and the second health score. Still, in some examples, the system(s) 110 may provide weight to one or more of the first health score or the second health score when determining the root-cause score. While these are just a couple example techniques of how the system(s) 110 may determine the root-cause score, in other examples, the system(s) 110 may determine the root-cause score using additional and/or alternative techniques.

An operation 1010 represents generating a user interface that includes at least the first health score, the second health score, and the root-cause score and an operation 1012 representing providing the user interface. For instance, the system(s) 110 may generate the user interface that includes the first health score, the second health score, and the root-cause score. In some examples, the user interface includes graphics representing the scores, similar to the example of FIG. 3B. The system(s) 110 may then send the user interface to a user device so that the user device is able to display the user interface to a user. The user is then able to use both the health scores and the root-cause score in order to determine priorities associated with at least the first service and the second service. For example, the user may determine to prioritize the service that includes the lowest health score. For another example, the user may determine to prioritize the service that includes the highest root-cause score. In either of these examples, the user device may receive inputs representing the priorities and send, back to the system(s), data representing the priorities.

Figure 11:
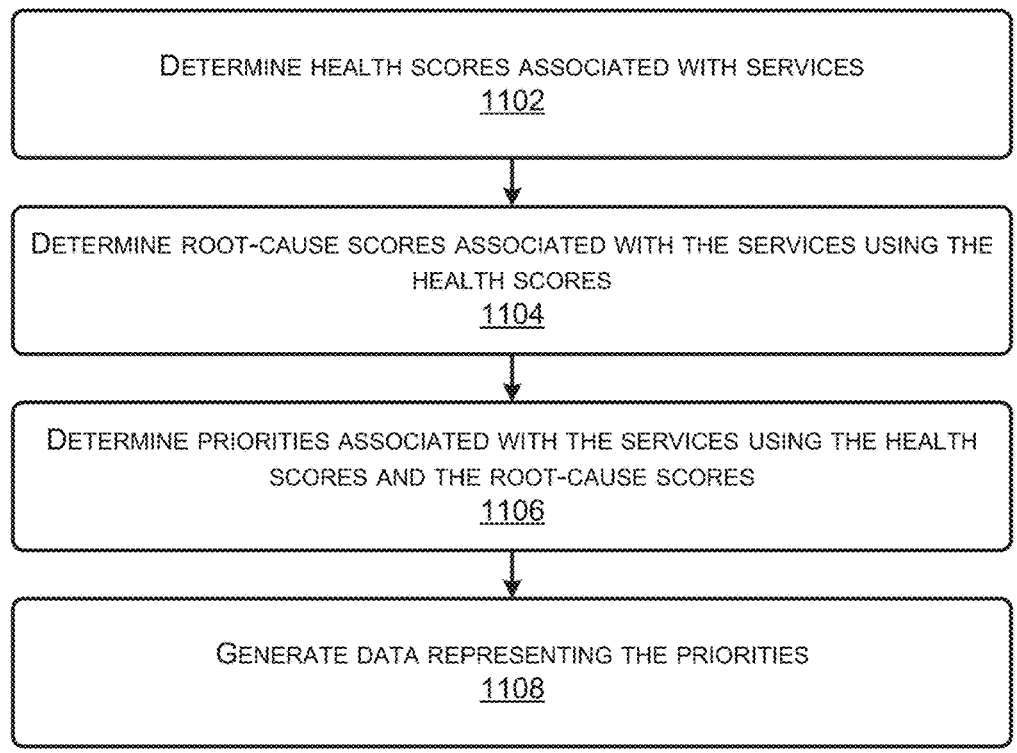
FIG. 11 illustrates a flow diagram of an example process for prioritizing services using health scores and root-cause scores associated with the services, in accordance with the present concepts.

FIG. 11 illustrates a flow diagram of an example process 1100 for prioritizing services using health scores and root-cause scores associated with the services, in accordance with the present concepts. An operation 1102 represents determining health scores associated with services. For instance, the system(s) 110 may determine the health scores associated with the services. In some examples, the system(s) 110 determine the health scores using KPIs associated with the services. Additionally, in some examples, the system(s) 110 may use one or more microservice management tools to determine the health stores. The services may be associated with a service mesh, where the services include one or more dependencies with one another.

An operation 1104 represents determining root-cause scores associated with the services using the health scores. For instance, the system(s) 110 may determine the root-cause scores associated with the services using the health scores. For a first example, and for a service, the system(s) 110 may determine the root-cause score using an average of the health scores for the service and the dependent services. For a second example, and again for a service, the system(s) 110 may determine the root-cause score using the lowest health score from among the health scores for the service and the dependent services. Still, for a third example, and again for a service, the system(s) 110 may determine the root-cause score using the highest health score from among the health scores for the service and the dependent services. Additionally, in some examples, the system(s) 110 may use one or more weights when determining the root-cause score. For example, the system(s) 110 may use a first weight for a first health score of a first service, a second weight for a second health score of a second service, a third weight for a third health score of a third service, and/or so forth. While these are just a couple example techniques of how the system(s) 110 may determine the root-cause scores using the health scores, in other examples, the system(s) 110 may determine the root-cause scores using additional and/or alternative techniques.

An operation 1106 represents determining priorities associated with the services using the health scores and the root-cause scores and an operation 908 represents generating data representing the priorities. For instance, the system(s) 110 may determine the priorities associated with the services. In some examples, the system(s) 110 determine the priorities using input data received from a user device, where the inputs indicate the priorities. Additionally, or alternatively, in some examples, the system(s) 110 determine the priorities by analyzing the health scores and/or the root-cause scores. For a first example, the system(s) 110 may determine the priorities based on the health scores, where the system(s) 110 determine that a first service with a lowest health score is prioritized first, followed by a second service with the second lowest health score, followed by a third service with the third lowest health score, and/or so forth. For a second example, the system(s) 110 may determine the priorities based on the root-cause scores, where the system(s) 110 determine that a first service with a highest root-cause score is prioritized first, followed by a second service with the second highest root-cause score, followed by a third service with the third highest root-cause score, and/or so forth.

Still, for a third example, the system(s) 110 may determine the priorities for the services using a combination of the health scores and the root-cause scores. For instance, the system(s) 110 may use the health scores and the root-cause scores to prioritize the services in such a way that fixes the problems that are occurring with the services. While these are just a couple example techniques of how the system(s) 110 may determine the priorities using the health scores and the root-cause scores, in other examples, the system(s) 110 may use additional and/or alternative techniques to determine the priorities using the health scores and the root-cause scores. In any of the examples, the system(s) 110 may then generate the data representing the priorities for the services.

Figure 12:
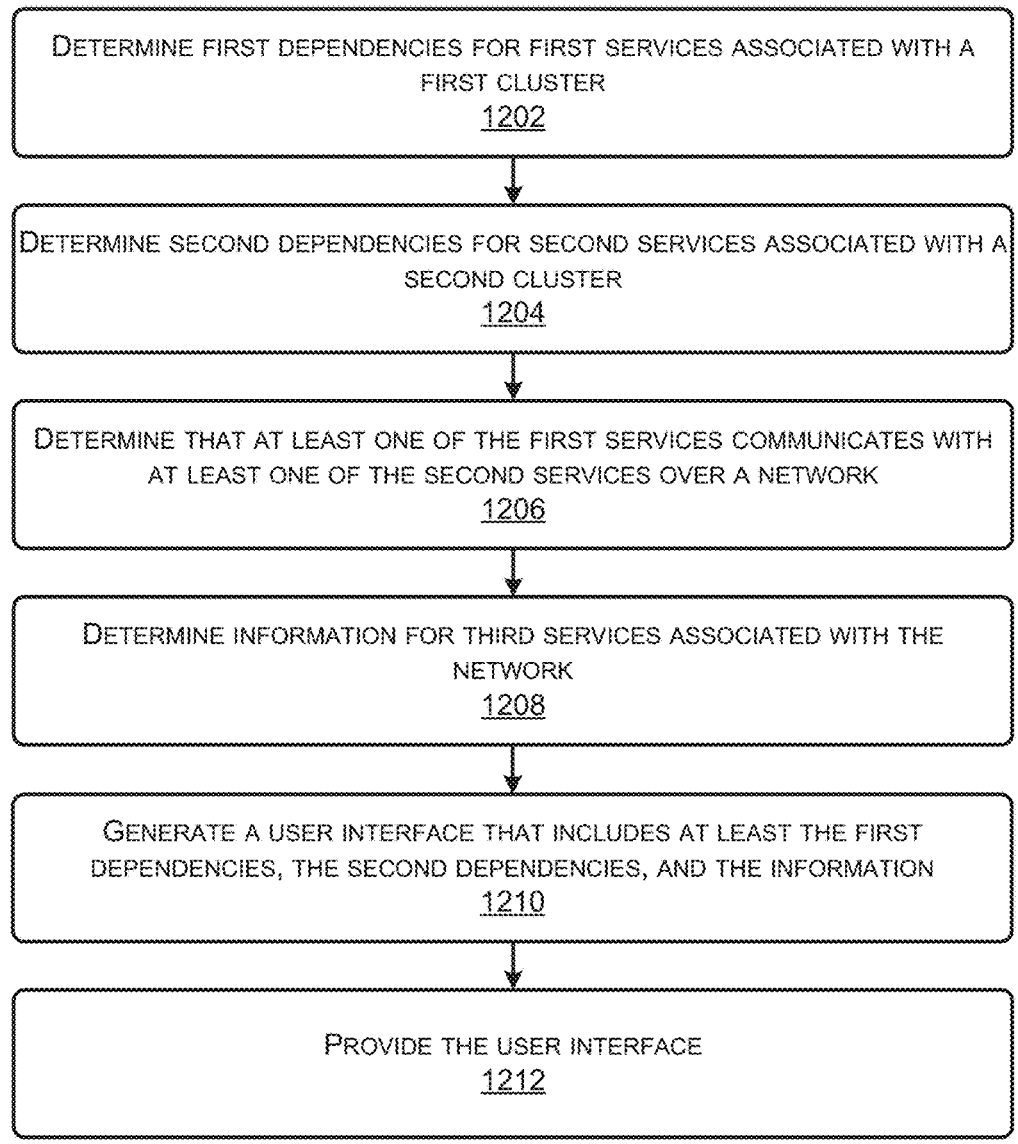
FIG. 12 illustrates a flow diagram of an example process for providing cluster dependency information along with inter-cluster dependency information, in accordance with the present concepts.

FIG. 12 illustrates a flow diagram of an example process 1200 for providing cluster dependency information along with inter-cluster dependency information, in accordance with the present concepts. An operation 1202 represents determining first dependencies for first services associated with a first cluster and an operation 1204 represents determining second dependencies for second services associated with a second cluster. For instance, the system(s) 110 may determine the first dependencies for the first services and the second dependencies for the second services. In some examples, the system(s) 110 determine the first dependencies and/or the second dependencies using one or more micromanagement tools.

An operation 1206 represents determining that at least one of the first services communicates with at least one of the second services over a network and an operation 1208 represents determining information for third services associated with the network. For instance, the system(s) 110 may determine that there are interconnections between at least one of the first services of the first cluster and at least one of the second services of the second cluster. As such, the system(s) 110 may perform one or more of the processes described herein in order to determine the information associated with this inter-cluster segment that includes the third services. As described herein, the information may include at least third dependencies associated with the third services and/or performance information associated with the third services.

An operation 1210 represents generating a user interface that includes at least the first dependencies, the second dependencies, and the information. For instance, the system(s) 110 may generate the user interface that includes the first dependencies for the first services associated with the first cluster, the second dependencies for the second services associated with the second cluster, and the inter-cluster segment information. In some examples, the system(s) 110 generate the user interface to initially include the first dependencies for the first services associated with the first cluster, the second dependencies for the second services associated with the second cluster, and an interface element for viewing the information. However, in other examples, the system(s) 110 generate the user interface to already include the first dependencies for the first services associated with the first cluster, the second dependencies for the second services associated with the second cluster, and the inter-cluster segment information.

An operation 1212 represents providing the user interface. For instance, the system(s) 110 may send the user interface to a user device so that the user device is able to display the user interface to the user. When the user interface initially includes the first dependencies for the first services associated with the first cluster, the second dependencies for the second services associated with the second cluster, and an interface element for viewing the information, the user device may receive an input selecting the interface element. Based on the input, the user interface may then display the information associated with the inter-cluster segment, using one or more of the processes described herein.

Figure 13:
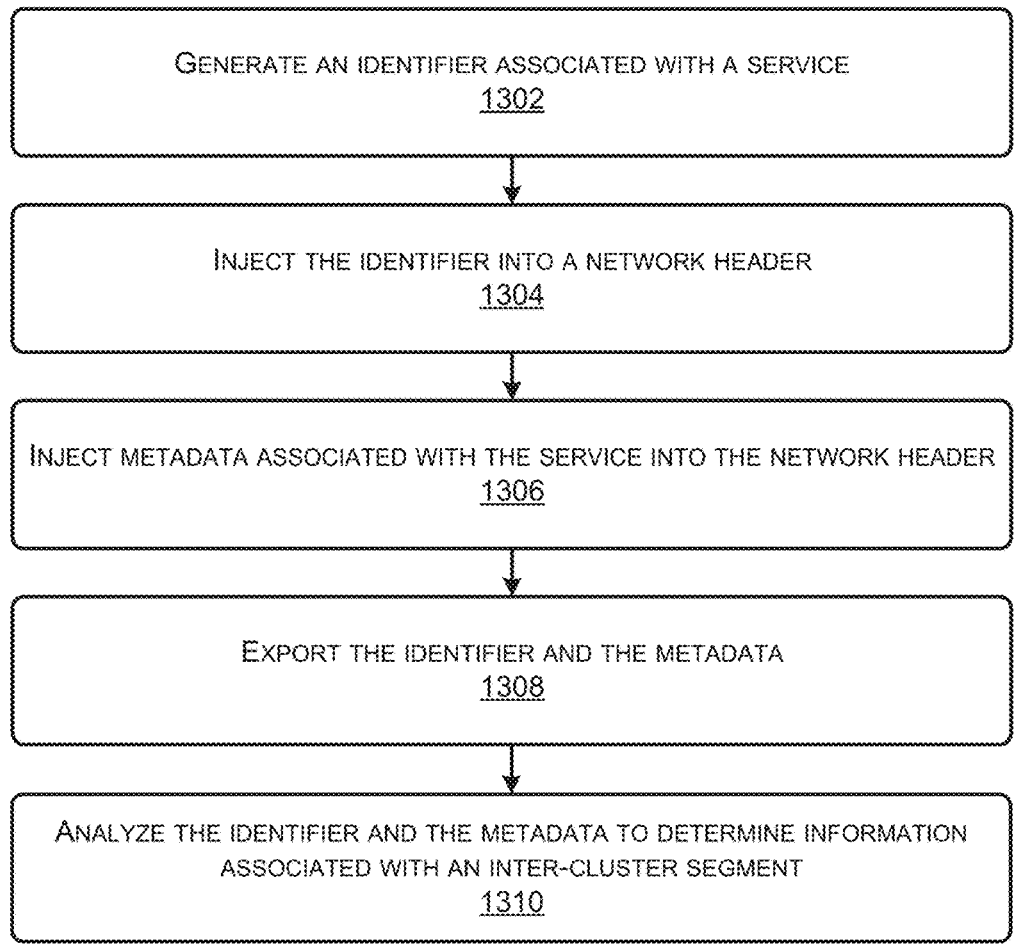
FIG. 13 illustrates a flow diagram of an example process for determining information associated with an inter-cluster segment, in accordance with the present concepts.

FIG. 13 illustrates a flow diagram of an example process 1300 for determining information associated with an inter-cluster segment, in accordance with the present concepts. An operation 1302 represents generating an identifier associated with a service. For instance, the system(s) 110 may initially determine that there are interconnections taking place within an inter-cluster segment that is between a first cluster associated with first services and a second cluster associated with second segments. As such, the system(s) may generate the identifier for the service, where the service may be included in the first cluster, the second cluster, or the inter-cluster segment. As described herein, the identifier may include, but is not limited to, a numerical identifier, an alphabetic identifier, a mixed numerical and alphabetic identifier, and/or any other type of identifier that may be used to identify the service.

An operation 1304 represents injecting the identifier into a network header and an operation 1306 represents injecting metadata associated with the service into the network header. For instance, the system(s) 110 may inject both the identifier and the metadata into the network header. In some examples, the system(s) 110 inject the identifier into Layer 4 of the network header and also inject the metadata into Layer 4 of the network header. In some examples, the system(s) 110 may also inject signaling to indicate the start and the end of the service into the network header. In such examples, the system(s) 110 may inject the signaling into Layer 3 of the network header.

An operation 1308 represents exporting the identifier and the metadata and an operation 1310 represents analyzing the identifier and the metadata to determine information associated with an inter-cluster segment. For instance, the system(s) 110 may export the identifier and the metadata from the network header. In some examples, the system(s) 110 export the identifier and the metadata using an exporter component and then collects the identifier and the metadata using a collector component. The system(s) 110 may then analyze the identifier and the metadata in order to determine the information associated with the service. As described herein, the information associated with the service may include at least dependencies and performance information associated with the inter-cluster segment.

Figure 14:
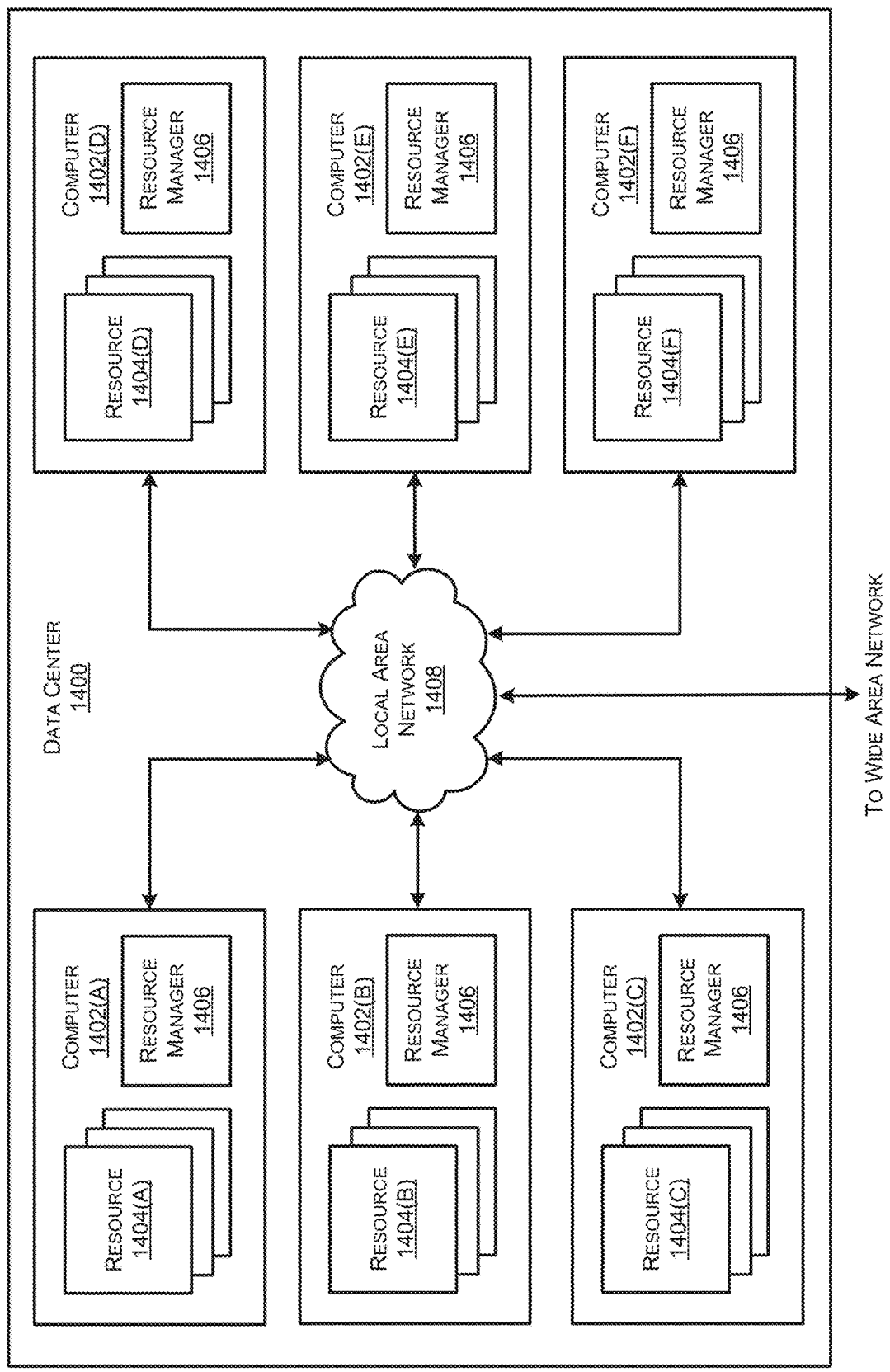
FIG. 14 illustrates a computing system diagram illustrating a configuration for a data center that can be utilized to implement aspects of the technologies disclosed herein.

FIG. 14 is a computing system diagram illustrating a configuration for a data center 1400 that can be utilized to implement aspects of the technologies disclosed herein. The example data center 1400 shown in FIG. 14 includes several computers 1402A-1402F (which might be referred to herein singularly as "a computer 1402" or in the plural as "the computers 1402") for providing computing resources. In some examples, the resources and/or computers 1402 may include, or correspond to, any type of networked device described herein. Although, computers 1402 may comprise any type of networked device, such as servers, switches, routers, hubs, bridges, gateways, modems, repeaters, access points, hosts, etc.

The computers 1402 can be standard tower, rack-mount, or blade server computers configured appropriately for providing computing resources. In some examples, the computers 1402 may provide computing resources 1404 including data processing resources such as virtual machine (VM) instances or hardware computing systems, database clusters, computing clusters, storage clusters, data storage resources, database resources, networking resources, and others. Some of the computers 1402 can also be configured to execute a resource manager 1406 capable of instantiating and/or managing the computing resources. In the case of VM instances, for example, the resource manager 1406 can be a hypervisor or another type of program configured to enable the execution of multiple VM instances on a single computer 1402. Computers 1402 in the data center 1400 can also be configured to provide network services and other types of services.

In the example data center 1400 shown in FIG. 14, an appropriate local area network (LAN) 1408 is also utilized to interconnect the computers 1402A-1402F. It should be appreciated that the configuration and network topology described herein has been greatly simplified and that many more computing systems, software components, networks, and networking devices can be utilized to interconnect the various computing systems disclosed herein and to provide the functionality described above. Appropriate load balancing devices or other types of network infrastructure components can also be utilized for balancing a load between data centers 1400, between each of the computers 1402A-1402F in each data center 1400, and, potentially, between computing resources in each of the computers 1402. It should be merely illustrative and that other implementations can be utilized.

In some examples, the computers 1402 may each execute one or more application containers and/or virtual machines to perform techniques described herein. For instance, the containers and/or virtual machines may serve as server devices, user devices, and/or routers in the cloud computing network.

In some instances, the data center 1400 may provide computing resources, like application containers, VM instances, and storage, on a permanent or an as-needed basis. Among other types of functionality, the computing resources provided by a cloud computing network may be utilized to implement the various services and techniques described above. The computing resources 1404 provided by the cloud computing network can include various types of computing resources, such as data processing resources like application containers and VM instances, data storage resources, networking resources, data communication resources, network services, and the like.

Each type of computing resource 1404 provided by the cloud computing network can be general-purpose or can be available in a number of specific configurations. For example, data processing resources can be available as physical computers or VM instances in a number of different configurations. The VM instances can be configured to execute applications, including web servers, application servers, media servers, database servers, some or all of the network services described above, and/or other types of programs. Data storage resources can include file storage devices, block storage devices, and the like. The cloud computing network can also be configured to provide other types of computing resources 1404 not mentioned specifically herein.

The computing resources 1404 provided by a cloud computing network may be enabled in one embodiment by one or more data centers 1400 (which might be referred to herein singularly as "a data center 1400" or in the plural as "the data centers 1400"). The data centers 1400 are facilities utilized to house and operate computer systems and associated components. The data centers 1400 typically include redundant and backup power, communications, cooling, and security systems. The data centers 1400 can also be located in geographically disparate locations. One illustrative embodiment for a data center 1400 that can be utilized to implement the technologies disclosed herein will be described below with regard to FIG. 15.

Figure 15:
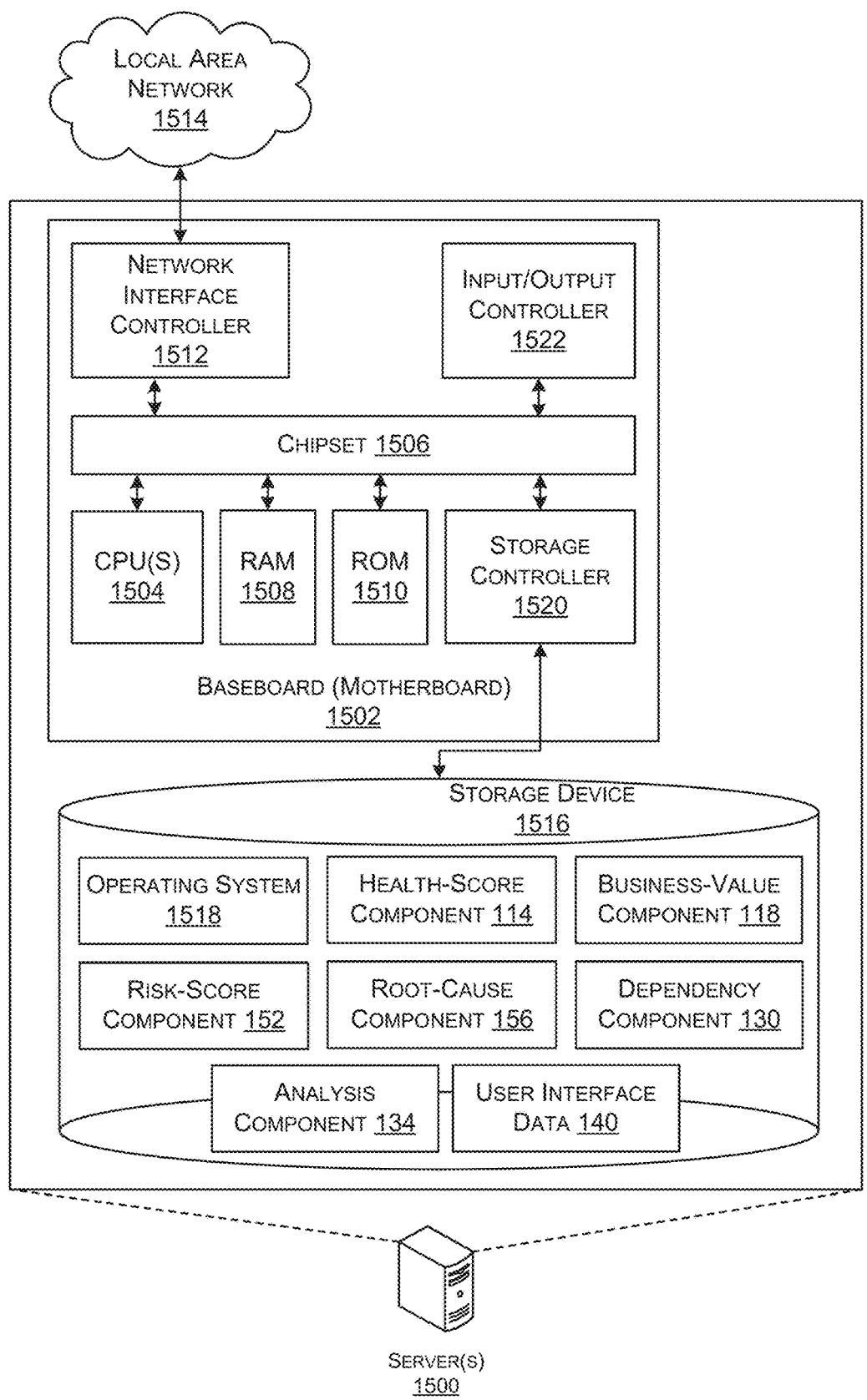
FIG. 15 is a computer architecture diagram showing an illustrative computer hardware architecture for implementing a server computing device that can be utilized to implement aspects of the various technologies presented herein.

FIG. 15 is a computer architecture diagram showing an illustrative computer hardware architecture for implementing a server computing device 1500 that can be utilized to implement aspects of the various technologies presented herein. The system(s) 140 discussed above, may include some or all of the components discussed below with reference to the server computing device 1500.

To begin, the server computer 1500 can be standard tower, rack-mount, or blade server computers configured appropriately for providing the computing resources described herein. As mentioned above, the computing resources provided by a cloud computing network, data center, or the like can be data processing resources such as VM instances or hardware computing systems, database clusters, computing clusters, storage clusters, data storage resources, database resources, networking resources, and others. Some of the servers 1500 can also be configured to execute a resource manager capable of instantiating and/or managing the computing resources. In the case of VM instances, for example, the resource manager can be a hypervisor or another type of program configured to enable the execution of multiple VM instances on a single server computer 1500. Server computers 1500 in a data center can also be configured to provide network services and other types of services.

The server computer 1500 includes a baseboard 1502, or "motherboard," which is a printed circuit board to which a multitude of components or devices can be connected by way of a system bus or other electrical communication paths. In one illustrative configuration, one or more central processing units (CPUs) 1504 operate in conjunction with a chipset 1506. The CPUs 1504 can be standard programmable processors that perform arithmetic and logical operations necessary for the operation of the computer 1500.

The CPUs 1504 perform operations by transitioning from one discrete, physical state to the next through the manipulation of switching elements that differentiate between and change these states. Switching elements generally include electronic circuits that maintain one of two binary states, such as flip-flops, and electronic circuits that provide an output state based on the logical combination of the states of one or more other switching elements, such as logic gates. These basic switching elements can be combined to create more complex logic circuits, including registers, adders-subtractors, arithmetic logic units, floating-point units, and the like.

The chipset 1506 provides an interface between the CPUs 1504 and the remainder of the components and devices on the baseboard 1502. The chipset 1506 can provide an interface to a RAM 1508, used as the main memory in the computer 1500. The chipset 1506 can further provide an interface to a computer-readable storage medium such as a read-only memory (ROM) 1510 or non-volatile RAM (NVRAM) for storing basic routines that help to startup the computer 1500 and to transfer information between the various components and devices. The ROM 1510 or NVRAM can also store other software components necessary for the operation of the computer 1500 in accordance with the configurations described herein.

The computer 1500 can operate in a networked environment using logical connections to remote computing devices and computer systems through a network, such as a local area network. The chipset 1506 can include functionality for providing network connectivity through a Network Interface Card (NIC) 1512, such as a gigabit Ethernet adapter. The NIC 1512 is capable of connecting the computer 1500 to other computing devices over network(s) 1514. It should be appreciated that multiple NICs 1512 can be present in the computer 1500, connecting the computer to other types of networks and remote computer systems.

The computer 1500 can be connected to a storage device 1516 that provides non-volatile storage for the computer. The storage device 1516 can store an operating system 1518 and data, which have been described in greater detail herein. The storage device 1516 can be connected to the computer 1500 through a storage controller 1520 connected to the chipset 1506. The storage device 1516 can consist of one or more physical storage units. The storage controller 1520 can interface with the physical storage units through a serial attached SCSI (SAS) interface, a serial advanced technology attachment (SATA) interface, an FC interface, or other type of interface for physically connecting and transferring data between computers and physical storage units.

The computer 1500 can store data on the storage device 1516 by transforming the physical state of the physical storage units to reflect the information being stored. The specific transformation of physical state can depend on various factors, in different embodiments of this description. Examples of such factors can include, but are not limited to, the technology used to implement the physical storage units, whether the storage device 1516 is characterized as primary or secondary storage, and the like.

For example, the computer 1500 can store information to the storage device 1516 by issuing instructions through the storage controller 1520 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The computer 1500 can further read information from the storage device 1516 by detecting the physical states or characteristics of one or more particular locations within the physical storage units.

In addition to the mass storage device 1516 described above, the computer 1500 can have access to other computer-readable storage media to store and retrieve information, such as program modules, data structures, or other data. It should be appreciated by those skilled in the art that computer-readable storage media is any available media that provides for the non-transitory storage of data and that can be accessed by the computer 1500. In some examples, the operations performed by the computer 1500, and or any components included therein, may be supported by one or more devices similar to computer 1500.

By way of example, and not limitation, computer-readable storage media can include volatile and non-volatile, removable and non-removable media implemented in any method or technology. Computer-readable storage media includes, but is not limited to, RAM, ROM, erasable programmable ROM (EPROM), electrically-erasable programmable ROM (EEPROM), flash memory or other solid-state memory technology, compact disc ROM (CD-ROM), digital versatile disk (DVD), high definition DVD (HD-DVD), BLU-RAY, or other optical storage, magnetic cassettes, magnetic tape, magnetic disk storage or other magnetic storage devices, or any other medium that can be used to store the desired information in a non-transitory fashion.

As mentioned briefly above, the storage device 1516 can store an operating system 1518 utilized to control the operation of the computer 1500. According to one embodiment, the operating system comprises the LINUX operating system. According to another embodiment, the operating system comprises the WINDOWS® SERVER operating system from MICROSOFT Corporation of Redmond, Washington. According to further embodiments, the operating system can comprise the UNIX operating system or one of its variants. It should be appreciated that other operating systems can also be utilized. The storage device 1516 can store other system or application programs and data utilized by the computer 1500.

In one embodiment, the storage device 1516 or other computer-readable storage media is encoded with computer-executable instructions which, when loaded into the computer 1500, transform the computer from a general-purpose computing system into a special-purpose computer capable of implementing the embodiments described herein. These computer-executable instructions transform the computer 1500 by specifying how the CPUs 1504 transition between states, as described above. According to one embodiment, the computer 1500 has access to computer-readable storage media storing computer-executable instructions which, when executed by the computer 1500, perform the various processes described above with regard to FIGS. 5-10. The computer 1500 can also include computer-readable storage media having instructions stored thereupon for performing any of the other computer-implemented operations described herein.

The computer 1500 can also include one or more input/output controllers 1522 for receiving and processing input from a number of input devices, such as a keyboard, a mouse, a touchpad, a touch screen, an electronic stylus, or other type of input device. Similarly, an input/output controller 1522 can provide output to a display, such as a computer monitor, a flat-panel display, a digital projector, a printer, or other type of output device. It will be appreciated that the computer 1500 might not include all of the components shown in FIG. 15, can include other components that are not explicitly shown in FIG. 15, or might utilize an architecture completely different than that shown in FIG. 15.

As further illustrated in the example of FIG. 15, the computer 1500 may store the health-score component 114, the business-value component 148, the risk-score component 152, the root-cause component 156, the dependency component 130, the analysis component 134, and/or the user interface data 140.

While the invention is described with respect to the specific examples, it is to be understood that the scope of the invention is not limited to these specific examples. Since other modifications and changes varied to fit particular operating requirements and environments will be apparent to those skilled in the art, the invention is not considered limited to the example chosen for purposes of disclosure, and covers all changes and modifications which do not constitute departures from the true spirit and scope of this invention.

Although the application describes embodiments having specific structural features and/or methodological acts, it is to be understood that the claims are not necessarily limited to the specific features or acts described. Rather, the specific features and acts are merely illustrative of some embodiments that fall within the scope of the claims of the application.

What is claimed is:

1. A method for providing flow visibility for data flow between services of a service provider in a secure network environment, the method comprising:
routing an encrypted data flow over a network that connects a first service of the secure network environment with a second service of the secure network environment;
obtaining, from at least one of a first device associated with the first service or a second device associated with the second service, routing information of the encrypted data flow that includes, in headers of the encrypted data flow, identifiers that are associated with the first service or the second service, the identifiers being generated and assigned to the first service or the second service by a management tool of the network based on determining there is an interconnection between the first service and the second service;

determining, based at least in part on the identifiers and the routing information, dependencies between the first service and the second service within the secure network environment; and generating a user interface to visually represent information regarding the dependencies between the first service and the second service.

2. The method as in claim 1, wherein the user interface further comprises an interface element for viewing the information, further comprising:
providing the user interface;
receiving input data representing a selection of the interface element; and
based at least in part on the selection of the interface element, causing the user interface to include visual elements representing the information along with the dependencies between the first service and the second service, the dependencies.

3. The method as in claim 1, generating a health score for at least one of the first service or the second service, the health score being based at least in part upon the dependencies between the first service and the second service.

4. The method as in claim 3, further comprising generating the user interface to provide the dependencies between the first service and second service and the health score for at least one of the first service or the second service.

5. The method as in claim 3, wherein the health score includes one or more of a latency, an error rate, or a packet drop rate.

6. The method as in claim 1, wherein the network further connects with a third device associated with a third service, and the routing information of the encrypted data flow is obtained by at least one of the first device, the second device, or the third device.

7. The method as in claim 1, wherein the headers further comprise metadata or signaling associated with the first service or the second service.

8. A system for providing network analytics, the system comprising:
one or more processors; and
one or more non-transitory computer-readable media storing computer-executable instructions that, when executed by the one or more processors, cause the one or more processors to perform operations comprising:
routing an encrypted data flow over a network that connects a first service of a first service cluster with a second service of a second service cluster;
obtaining routing information of the encrypted data flow, the routing information being obtained from at least one of a first device associated with the first service of the first service cluster or a second device associated with the second service of the second service cluster;
determining dependencies between the first service and the second service based at least in part upon the routing information, the dependencies including first dependencies associated with the first service cluster and second dependencies associated with the second service cluster; and
generating a user interface to provide information regarding the dependencies between the first service cluster and the second service of the second service cluster, the user interface comprising visual representations of the dependencies.

9. The system as in claim 8, wherein the user interface further comprises an interface element to view the information.

10. The system as in claim 8, the operations further comprising generating a health score for at least one of the first service or the second service, the health score being based at least in part upon the dependencies between the first service and the second service.

11. The system as in claim 10, further comprising generating the user interface to provide the dependencies between the first service and second service and the health score for at least one of the first service or the second service.

12. The system as in claim 10, wherein the health score includes one or more of a latency, an error rate, or a packet drop rate.

13. The system as in claim 8, wherein the network further connects a third device associated with a third service, and the routing information of the encrypted data flow is obtained by at least one of the first device, the second device, or the third device.

14. The system as in claim 8, wherein the routing information further comprises identifiers associated with the first service or the second service in headers of data packets, the identifiers being generated and assigned to the first service or the second service in response to determining that there is an interconnection between the first service cluster and the second service cluster.

15. One or more non-transitory computer-readable media storing computer-executable instructions that, when executed by one or more processors, cause the one or more processors to perform operations comprising:
routing, within a secure network environment, an encrypted data flow over a network that connects a first service with a second service;
obtaining, from at least one of a first device associated with the first service or a second device associated with the second service, routing information of the encrypted data flow that includes, in headers of the encrypted data flow, identifiers that are associated with the first service or the second service, the identifiers being generated and assigned by a management tool of the network; and
determining, based at least in part on the identifiers and the routing information, dependencies between the first service and the second service within the secure network environment.

16. The one or more non-transitory computer-readable media as in claim 15, the operations further comprising generating a user interface to provide information regarding the dependencies between the first service and the second service.

17. The one or more non-transitory computer-readable media as in claim 15, the operations further comprising generating a health score for at least one of the first service or the second service, the health score being based at least in part upon the dependencies between the first service and the second service.

18. The one or more non-transitory computer-readable media as in claim 17, the operations further comprising, generating a user interface to provide the dependencies between the first service and second service and the health score for at least one of the first service or the second service.

19. The one or more non-transitory computer-readable media as in claim 17, wherein the health score includes one or more of a latency, an error rate, or a packet drop rate.

20. The one or more non-transitory computer-readable media as in claim 15, wherein the headers further comprise metadata or signaling associated with the first service or the second service.

* * * * *